(12) United States Patent
Albasha et al.

(10) Patent No.: US 11,614,530 B2
(45) Date of Patent: Mar. 28, 2023

(54) MINIATURIZED DIGITAL RADAR SYSTEM

(71) Applicant: American University of Sharjah, Sharjah (AE)

(72) Inventors: Lutfi Albasha, Sharjah (AE); Hasan Mir, Sharjah (AE)

(73) Assignee: AMERICAN UNIVERSITY OF SHARJAH, Sharjah (AE)

( * ) Notice: Subject to any disclaimer, the term of this patent is extended or adjusted under 35 U.S.C. 154(b) by 413 days.

(21) Appl. No.: 16/849,864

(22) Filed: Apr. 15, 2020

(65) Prior Publication Data

US 2020/0326416 A1 Oct. 15, 2020

Related U.S. Application Data

(60) Provisional application No. 62/834,248, filed on Apr. 15, 2019.

(51) Int. Cl.
*G01S 13/02* (2006.01)
*G01S 13/66* (2006.01)
*G01S 7/285* (2006.01)

(52) U.S. Cl.
CPC .............. *G01S 13/02* (2013.01); *G01S 7/285* (2013.01); *G01S 13/66* (2013.01)

(58) Field of Classification Search
CPC .......... H04B 1/40; H04B 1/44; H04B 1/0475; H04B 2001/045; H04B 7/0413; H04B 1/525; H04B 7/0452; H04B 1/18; H04B 1/48; G01S 13/003; G01S 13/87; G01S 13/48; G01S 13/878; G01S 1/02; G01S 7/032; G01S 13/04; G01S 3/043; G01S 11/02; G01S 7/02; G01S 13/88;

(Continued)

(56) References Cited

U.S. PATENT DOCUMENTS 5,172,231 A 12/1992 Jarick et al.
6,016,256 A * 1/2000 Crane, Jr. ........... H01L 23/5385
361/813

(Continued)

FOREIGN PATENT DOCUMENTS

WO WO-2014049088 A1 * 4/2014 ............. G01S 7/032

OTHER PUBLICATIONS

A.D. Chadwick, "Micro-Drone Detection using Software-Defined 3G Passive Radar," International Conference on Radar Systems, Radar 2017, 6 pages.

(Continued)

*Primary Examiner* — Olumide Ajibade Akonai
(74) *Attorney, Agent, or Firm* — Knobbe, Martens, Olson & Bear, LLP

(57) ABSTRACT

Aspects of this disclosure relate to a miniaturized digital radar system and method that can be fabricated on a Printed Circuit Board (PCB) and/or a chip, such as on a System-On-a-Chip (SOC). The digital radar system can operate at the S-band (e.g. in the range of 3 GHz). Advantageously, the S-band frequency range is less susceptible and/or not susceptible to clutter from precipitation and is well suited for long range surveillance applications. The small form factor of the miniaturized digital radar system on the PCB and/or the SOC can be implemented on small and/or low-observable platforms, such as on fixed or rotary wing unmanned aerial vehicles.

19 Claims, 22 Drawing Sheets

(58) Field of Classification Search
CPC . G01S 7/35; G01S 7/285; G01S 7/352; G01S 7/524; G01S 7/527; G01S 7/5273; G01S 13/343; G01S 7/354
See application file for complete search history.

(56) References Cited

U.S. PATENT DOCUMENTS

| | | | |
|---|---|---|---|
| 8,400,349 | B1 | 3/2013 | Dubbert et al. |
| 9,194,946 | B1 | 11/2015 | Vacanti |
| 9,478,858 | B1 * | 10/2016 | West .................... G01S 13/953 |
| 2006/0012513 | A1 * | 1/2006 | Walton ................. G01S 7/0235 342/135 |
| 2007/0176822 | A1 * | 8/2007 | Shirakawa .............. G01S 13/04 342/28 |
| 2010/0171563 | A1 * | 7/2010 | Dupuy ..................... H01P 1/15 333/136 |
| 2011/0025545 | A1 | 2/2011 | Cook et al. |
| 2013/0072125 | A1 | 3/2013 | Yoon et al. |
| 2015/0153445 | A1 * | 6/2015 | Jansen .................. G01S 13/003 342/195 |
| 2015/0185314 | A1 | 7/2015 | Corcos et al. |
| 2017/0090011 | A1 | 3/2017 | West et al. |
| 2017/0285140 | A1 * | 10/2017 | Gupta .................... H03D 3/009 |
| 2018/0074152 | A1 | 3/2018 | Bowden |
| 2018/0348340 | A1 | 12/2018 | Lien et al. |
| 2018/0372844 | A1 | 12/2018 | Jungmaier et al. |
| 2020/0014429 | A1 * | 1/2020 | Leung .................. H04B 1/0067 |
| 2021/0028534 | A1 * | 1/2021 | Liu ......................... H01L 25/18 |

OTHER PUBLICATIONS

Á. D. de Quevedo, F. I. Urzaiz, J. G. Menoyo and A. A. López, "Drone Detection With X-Band Ubiquitous Radar," 2018 19th International Radar Symposium (IRS), Bonn, 2018, pp. 1-10.
B. Nuss, L. Sit, M. Fennel, J. Mayer, T. Mahler and T. Zwick, "MIMO OFDM radar system for drone detection," 2017 18th International Radar Symposium (IRS), Prague, 2017, pp. 1-9.
D. Shin, D. Jung, D. Kim, J. Ham and S. Park, "A Distributed FMCW Radar System Based on Fiber-Optic Links for Small Drone Detection," in IEEE Transactions on Instrumentation and Measurement, vol. 66, No. 2, pp. 340-347, Feb. 2017.
G. Fang, J. Yi, X. Wan, Y. Liu and H. Ke, "Experimental Research of Multistatic Passive Radar With a Single Antenna for Drone Detection," in IEEE Access, vol. 6, pp. 33542-33551, 2018.
I. Guvenc, F. Koohifar, S. Singh, M. L. Sichitiu and D. Matolak, "Detection, Tracking, and Interdiction for Amateur Drones," in IEEE Communications Magazine, vol. 56, No. 4, pp. 75-81, Apr. 2018.
International Search Report dated Jul. 14, 2020 for Application No. PCT/US20/28265, 25 pages.
J. Drozdowicz et al., "35 GHz FMCW drone detection system," 2016 17th International Radar Symposium (IRS), Krakow, 2016, pp. 1-4.
J. Ochodnický, Z. Matousek, M. Babjak and J. Kurty, "Drone detection by Ku-band battlefield radar," 2017 International Conference on Military Technologies (ICMT), Brno, 2017, pp. 613-616.
Kim, Byung-Kwan, et al. "Drone Detection with Chirp-Pulse Radar Based on Target Fluctuation Models." ETRI Journal, vol. 40, No. 2, Apr. 11, 2018, pp. 188-196.
M. Jian, Z. Lu and V. C. Chen, "Drone detection and tracking based on phase-interferometric Doppler radar," 2018 IEEE Radar Conference (RadarConf18), Oklahoma City, OK, 2018, pp. 1146-1149.
S. Björklund, "Target Detection and Classification of Small Drones by Boosting on Radar Micro-Doppler," 2018 15th European Radar Conference (EuRAD), Madrid, 2018, pp. 182-185.
S. Park and S. Park, "Configuration of an X-band FMCW radar targeted for drone detection," 2017 International Symposium on Antennas and Propagation (ISAP), Phuket, 2017, pp. 1-2.

Y. Kwag, I. Woo, H. Kwak and Y. Jung, "Multi-mode SDR radar platform for small air-vehicle Drone detection," 2016 CIE International Conference on Radar (Radar), Guangzhou, 2016, pp. 1-4.
Y. Liu, X. Wan, H. Tang, J. Yi, Y. Cheng and X. Zhang, "Digital television based passive bistatic radar system for drone detection," 2017 IEEE Radar Conference (RadarConf), Seattle, WA, 2017, pp. 1493-1497.
Abdlaziz et al., "An optimization model and Tabu search heuristic for scheduling of tasks on a radar sensor", IEEE Sens. J., 2016, 16, (17), pp. 6694-6702.
Adrian, "From AESA radar to digital radar for surface-based applications," in Proc. IEEE Radar Conf., May 2009, pp. 1-5.
Adrian, "Future surface radar technology: From air defence to air missle defence", in Proc. IEEE Radar Conf., Apr. 17-20, 2007, pp. 49-54.
Albasha, "Design and measurement of an integrated wideband radio frequency low-noise amplifier for terrestrial digital television applications," International Journal of Electronics, vol. 97, pp. 587-604, 2010.
Al-Alem, L. Albasha, and H. Mir, "High Resolution On-Chip S-Band Radar System Using Stretch Processing," IEEE Sensors Journal, vol. 16, pp. 4749-4759, Jun. 15, 2016.
Al-Alem,, "Chip level implementation of a digital radar system," M.S. thesis, Dept. Electr. Engr., American Univ. Sharjah, University City, Sharjah, 2015.
Alrifai, Y. Hatahet, S. Dhaoudi, F. Almabrouk, L. Albasha, and H. Mir, "Frequency Synthesizer System Implementation for Digital Radar," Proceedings of the 2018 IEEE Symposium on Computer Applications and Industrial Electronics, pp. 1-4. Apr. 2018.
Andreani, "A 2GHz, 17% tuning range quadrature CMOS VCO with high figure-of-merit and 0.6° phase error," in Proc. 28th Eur. Solid-State Circuits Conf., Sep. 2002, pp. 815-818.
Andrews and A. C. Molnar, "Implications of passive mixer transparency for impedance matching and noise figure in passive mixer-first receivers," IEEE Trans. Circuits Syst. I, Reg. Papers, vol. 57, No. 12, pp. 3092-3103, Dec. 2010.
Ash et al., "Practical Implementation of a 16-channel C-band phased array radar receiver", 2015 IEEE Radar Conf., Johannesburg, 2015, pp. 66-70.
Blunt et al., "Aspects of radar range super resolution", in proc. IEEE Radar Conf., Apr. 2007, pp. 683-687.
Caputi, "Stretch: A time-transformation technique", IEEE Trans. Aerosp. Electron. Syst., vol. AES-7, No. 2, pp. 269-278, Mar. 1971.
Chang et al., "A W-band single-chip transceiver for FMCW radar," in IEEE Microw. Millim.-Wave Monolithic Circuits Symp. Dig. Papers, Jun. 1993, pp. 41-44.
Crain et al., "Multi-channel conversion of the National Weather Radar Testbed receiver", in Proc. IEEE Radar Conf., May 4-8, 2009, pp. 1-5.
Derham et al., "Design and evaluation of a low-cost multistatic netted radar system", IET Radar, Sonar Navigat., vol. 1, No. 5, pp. 362-368, Oct. 2007.
George et al., "Extension of two-signal spurious-free dynamic range of wideband digital receivers using Kaiser window and compensation method", IEEE Trans. Microw. Theory Tech., 2007, 55, (4), pp. 788-794.
Girbau et al., "Remote sensing of vital signs using a Doppler radar and diversity to overcome null detection", IEEE Sens. J., 2012, 12, (3), pp. 512-518.
Graham, "Synthetic interferometer radar for topographic mapping", Proc. IEEE, vol. 62, No. 6, pp. 763-768, Jun. 1974.
Gupta et al., "Modular, multi-function digital-RF receiver systems," IEEE Trans. Appl. Supercond., vol. 21, No. 3, pp. 883-890, Jun. 2011.
Holloway et al., "Next-generation W-band radar testbed", IEEE Radar Conf., Apr. 17-20, 2007, pp. 65-71.
Jain et al., "Ground-to-air imaging radar for RCS measurements" IEEE Trans. Instrum. Meas., vol. 41, No. 6, pp. 951-956, Dec. 1992.
Li, Q. Yin, P. Mu, and W. Guo, "Robust MVDR beamforming using the DOA matrix decomposition," in Proc. 2011 1st Int. Symp. Access Spaces (ISAS), Jun. 2011, pp. 105-110.

(56) References Cited

OTHER PUBLICATIONS

Li et al., "Design considerations of the RF front-end for high dynamic range digital radar receivers", 17th Int. Conf. Microwaves, Radar and Wireless Communications, May 19-21, 2008, pp. 1-4.
Li et al., "Trade-off between sensitivity and dynamic range in designing digital radar receivers," in Proc. Int. Conf. Microw. Millim, Wave Technol., Apr. 2008, pp. 1368-1371.
Lin et al., "A Ka-band FMCW radar front-end with adaptive leakage cancellation", IEEE Trans. Microw. Theory Tech., vol. 54, No. 12, pp. 4041-4048, Dec. 2006.
Maas et al., "A mult-channel S-band FMCW radar front-end", 2008 European Microwave Integrated Circuit Conf., Amsterdam, 2008, pp. 506-509.
Mahn et al., "A two sweeping VCO source for heterodyne FMCW radar", IEEE Trans. Instrum. Meas., 2013, 62, (1), pp. 230-239.
Mao et al., "Demonstration of in-car Doppler laser radar at 1.55 μm for range and speed measurement", IEEE Trans. Intell. Transp. Syst., 2013, 14, (2), pp. 599-607.
Mensa, "Wideband radar cross section diagnostic measurements", IEEE Trans. Instrum. Meas., vol. IM-33, No. 3, pp. 206-214, Sep. 1984.
Mir et al., "A high dynamic range, wideband digital array radar testbed", IEEE Radar Conf., Apr. 17-20, 2007, pp. 65-71.
Mir et al., "A low-cost high-performance digital radar test bed", IEEE Trans. Instrum. Meas., 2013, 62 (1), pp. 221-229.
Mir, and L. Albasha, "On the Design of a High-Performance Digital Radar System," Proceedings of the 2013 IEEE Design and Test Symposium, pp. 1-6, Dec. 2013.
Mir et al., "Low-rate sampling technique for range-windowed radar/sonar using nonlinear frequency modulation", IEEE Trans. Aerosp. Electron. Syst., 2015, 51, (3), pp. 1972-1979.
Mir et al., "Sub-band STAR for stretch processed systems", IEEE Int. Conf. Acoustics, Speech and Signal Processing (ICASSP), Apr. 19-24, 2009, pp. 2025-2028.
Nelander et al., "Modular system design for new S-band marine radar", in Proc. Int. Radar Conf., Oct. 12-16, 2009, pp. 1-5.
Pohl, T. Jaeschke, and K. Aufinger, "An ultra-wideband 80 GHz FMCW radar system using a SiGe bipolar transceiver chip stabilized by a fractional-N PLL synthesizer," IEEE Trans. Microw. Theory Techn., vol. 60, No. 3, pp. 757-765, Mar. 2012. [12] K. W. Chang et al., A W-band single-chip.
Peng, B. et al. "Sinusoidal frequency modulation sparse recovery for precession rate estiation using low-frequency long-range radar", IEEE Sens. J., 2015, 15 (12), pp. 7329-7340.
Prakasam et al., "Digital signal generator and receiver design for S-band radar", in Proc. IEEE Radar Conf., Apr. 2007, pp. 1049-1054.
Rabideau et al., "An S-band digital array radar testbed", IEEE Int. Symp. Phased Array Systems and Technology, Oct. 2003, pp. 113-118.
Rabideau et al., "Ubiquitous MIMO multifunction digital array radar", The Thirty-Seventh Asilomar Conf. Signals, Systems & Computers, 2003, vol. 1, pp. 1057-1064.
Rihaczek, "Radar signal design for target resolution", Proc. IEEE, vol. 53, No. 2, pp. 116-128, Feb. 1965.
Rogers and C. Plett, Radio Frequency Integrated Circuit Design. Boston, MA, USA: Artech House, 2003.
Saunders et al., "A single-chip 24 GHz SiGe BiCMOS transceiver for low cost FMCW airborne radars," in Proc. IEEE Nat. Aerosp. Electron. Conf. (NAECON), Jul. 2009, pp. 244-247.
Schikorr, "High range resolution with digital stretch processing," in Proc. IEEE Radar Conf., May 2008, pp. 1-6.
Taghadosi et al., "Integrated Stretch Processed S-Band Digital Radar System", Department of Electrical Engineering, American University of Sharjah United Arab Emirates.
Taghadosi, L. Albasha and H. Mir, "Miniaturised stretch processed radar transceiver," IET Microwaves, Antennas & Propagation, vol. 12, No. 3, pp. 320-325, 2 28 2018.
Thompson et al., "An 8-bit 2-gigasample/second A/D converter multichip module for digital receiver demonstration on navy AN/APS-145 E2-C airborne early warning aircraft radar", IEEE Trans. Compon. Packag. Manufact. Technol. B, 1998, 21, (4), pp. 447-462.
Tice, "An overview of radar cross section measurement techniques", IEEE Trans. Instrum. Meas., vol. 30, No. 1, pp. 205-207, Feb. 1990.
Tshe, D. Purik, and S. H. Han, "Range resolution improvement of pulse compression radar," in Proc. 3rd Int. Asia-Pacific Conf. Synth. Aperture Radar, Sep. 2011, pp. 1-4.
Tsui et al., "Digital microwave receiver technology", IEEE Trans. Microw. Theory Tech., 2002, 50, (3), pp. 699-705.
Van Trees, "Optium Array Processing (Detection, Estimation, and Modulation Theory, Part IV", Hoboken, NJ, Wiley, 2002.
Wang "Phased-MIMO radar with frequency diversity for rangedependent beaforming", IEEE Sens. J., 2013, 13, (4), pp. v1320-v1328.
Wang et al., "A UHF-band narrow-band HTS Bandpass filter with wide stopband using interdigital structure", IEEE Trans. Appl. Supercond., 2013, 23, (6), pp. 3-7.
Wehner, "High resolution radar", Norwood, MA, 1994.
Wu et al., "The design of digital radar receivers", IEEE Aerosp. Electron. Syst. Mag. 1998, 13, (1), pp. 35-41.
Yan, J. et al., "Benefit analysis of data fusion for target tracking in multiple radar system", IEEE Sens. J., 2015, 16 (16), pp. 6359-6366.
Yeary et al., "An update on the multi-channel phased array weather radar at the National Weather Radar Testbed", in Proc. IEEE Radar Conf., May 23-27, 2011, pp. 971-973.
Yeh, K. T. Wong, and H. S. Mir, "Viable/inviable polynomial-phase modulations for 'stretch processing,'" IEEE Trans. Aerosp. Electron. Syst., vol. 48, No. 1, pp. 923-926, Jan. 2012.
Yu et al., "An indoor S-band radar receive array testbed," IEEE Radar Conf., May 10-14, 2010, pp. 712-717.
Yu et al., "A single-chip X-band chirp radar MMIC with stretch processing," in Proc. IEEE Custom Integr. Circuits Conf., Sep. 2012, pp. 1-4.
Zatman et al., "Digitization requirments for digital array radars" 2001 Proc. IEEE Radar Conf., 2001, pp. 163-168.
Zu et al., "Space-time-range adaptive processing for airborne radar systems", IEEE Sens. J., 2015, 15 (3), pp. 1602-1610.

\* cited by examiner

FIG. 10

MINIATURIZED DIGITAL RADAR SYSTEM

CROSS-REFERENCE TO RELATED APPLICATIONS

This application claims priority from provisional U.S. Pat. App. No. 62/834,248, filed on Apr. 15, 2019, which is hereby incorporated by reference in its entirety.

BACKGROUND

Beamforming is a signal processing technique used in sensor arrays for directional signal transmission and/or reception. Beamforming can be typically used at both the transmitter and the receiver in order to achieve spatial selectivity, such as to move the directivity of the beam in a certain direction. For example, a radar system can transmit signals that combine signal strength at a particular angle via constructive interference while destructively interfering in other directions. The radar system can control a phase and relative amplitude of the signal at each transmitter to create the constructive and destructive interference pattern in a wave front. When receiving, the received signals at multiple antenna elements can be combined in a way where the expected pattern of radiation is observed at a particular angle. Beamforming can be applied in many applications, such as in radar, sonar, wireless communications, acoustics, and the like.

SUMMARY

Some embodiments include an integrated circuit for a digital radar system, the integrated circuit can comprising: one or more transmit channels, each transmit channel comprising a plurality of up-converter stages, wherein the plurality of up-converter stages comprise: a first up-converter stage comprising a first mixer configured to up-convert a baseband chirp signal; and a second up-converter stage comprising a frequency doubler configured to double the frequency of the output of the first up-converter stage to a S-band frequency; one or more antenna elements configured to transmit an output of the corresponding transmit channels and receive reflected transmit signals for corresponding receive channels; a multiple-pole multiple-throw antenna switch configured to electrically connect the one or more transmit channels to the corresponding antenna elements, and to electrically connect one or more receive channels to the corresponding antenna elements; the one or more receive channels, each receive channel comprising a plurality of down-converter stages, wherein the plurality of down-converter stages comprise: a first down-converter stage comprising a passive mixer configured to perform stretch processing on a signal with approximately 600 MHz bandwidth such that components in the corresponding receive channel operate in a linear region; and a second down-converter stage comprising a second mixer to down-convert the output of the first down-converter stage; one or more analog-to-digital converters configured to convert the output of corresponding receive channels from analog to digital signals; and a digital signal processor to process the digital signals.

In some embodiments, the baseband chirp signal is approximately 300 MHz.

In some embodiments, the first down-converter stage further comprises an interdigital bandpass filter configured to increase a first spurious response by approximately three times and suppress a second resonant frequency.

In some embodiments, the second down-converter stage further comprises a hairpin filter.

In some embodiments, the integrated circuit further comprises a local oscillator channel that operates at a frequency that is approximately 760 MHz different than the transmit channels.

In some embodiments, the first down-converter stage further comprises an IF filter configured to limit the bandwidth.

In some embodiments, the first and second down-converter stages are configured to reduce intermodulation distortion resulting from mixing the reflected transmit signal with a reference local oscillator signal.

In some embodiments, the first down-converter stage further comprises a capacitive coupled bandpass filter.

In some embodiments, the capacitive coupled bandpass filter comprises parallel L-C resonators.

Some embodiments include an integrated circuit for a digital radar system, the integrated circuit comprising: one or more transmit channels, each transmit channel comprises: a first up-converter stage comprising a first mixer configured to up-convert a baseband chirp signal; and a second up-converter stage comprising a frequency multiplier configured to multiply the frequency of the output of the first up-converter stage to S-band frequency; one or more antenna elements configured to transmit an output of the corresponding transmit channels and receive reflected transmit signals for corresponding receive channels; an antenna switch configured to electrically connect the one or more transmit channels to the corresponding antenna elements, and to electrically connect one or more receive channels to the corresponding antenna elements; the one or more receive channels, each receive channel comprises: a first down-converter stage comprising a second mixer configured to perform stretch processing such that components in the corresponding receive channel operate in a linear region; and a second down-converter stage comprising a third mixer to down-convert the output of the first down-converter stage; one or more analog-to-digital converters configured to convert the output of corresponding receive channels from analog to digital signals; and a digital signal processor to process the digital signals In some embodiments, the integrated circuit is fabricated on a single printed circuit board (PCB).

In some embodiments, the integrated circuit is configured to detect drones.

In some embodiments, each of the transmit channels comprise at least one programmable time delay, the integrated circuit configured to adjust the programmable time delays to steer the transmitted signals in a particular direction with a signal of over 500 MHz.

In some embodiments, the integrated circuit further comprises a local oscillator channel that synchronizes the receive channels in approximately 400 µs.

In some embodiments, the one or more antenna elements comprise: a single transmit antenna element configured to transmit the output of the transmit channel omnidirectionally, and a plurality of receive antenna elements configured to receive the reflected transmit signal.

In some embodiments, the integrated circuit forms a multi chip module, wherein each of the one or more transmit channels are disposed on separate layers of the multi chip module, and each of the one or more receive channels are disposed on separate layers of the multi chip module.

In some embodiments, the integrated circuit forms a multi chip module, wherein each of the one or more receive channels are disposed on separate layers of the multi chip module.

In some embodiments, the integrated circuit forms a multi chip module, wherein each of the one or more transmit channels are disposed on separate layers of the multi chip module.

Some embodiments include a method, the method comprising: up-converting, by a first mixer in a first up-converter stage of a transmit channel, a baseband chirp signal; multiplying, buy a frequency multiplier in a second up-converter stage of the transmit channel, the output of the first up-converter stage to S-band frequency; transmitting the output of the transmit channel; receiving, by a receive channel, a reflected signal of the transmitted output; performing, by a second mixer in a first down-converter stage of a receive channel, stretch processing on the received reflected signal; down-converting, by a third mixer in a second down-converter stage of the receive channel, the output of the first down-converter stage; and processing, by a processor, digitized signals corresponding to the output of the second down-converter stage.

In some embodiments, processing the digitized signals comprises detecting airplanes.

BRIEF DESCRIPTION OF DRAWINGS

Embodiments of various inventive features will now be described with reference to the following drawings and appendices. Throughout the drawings, reference numbers may be re-used to indicate correspondence between referenced elements. The drawings are provided to illustrate example embodiments described herein and are not intended to limit the scope of the disclosure.

FIG. 10 illustrates receiver and transmitter components and cascaded linearity, gain and noise figure, according to some embodiments.

DETAILED DESCRIPTION

Figure 1:
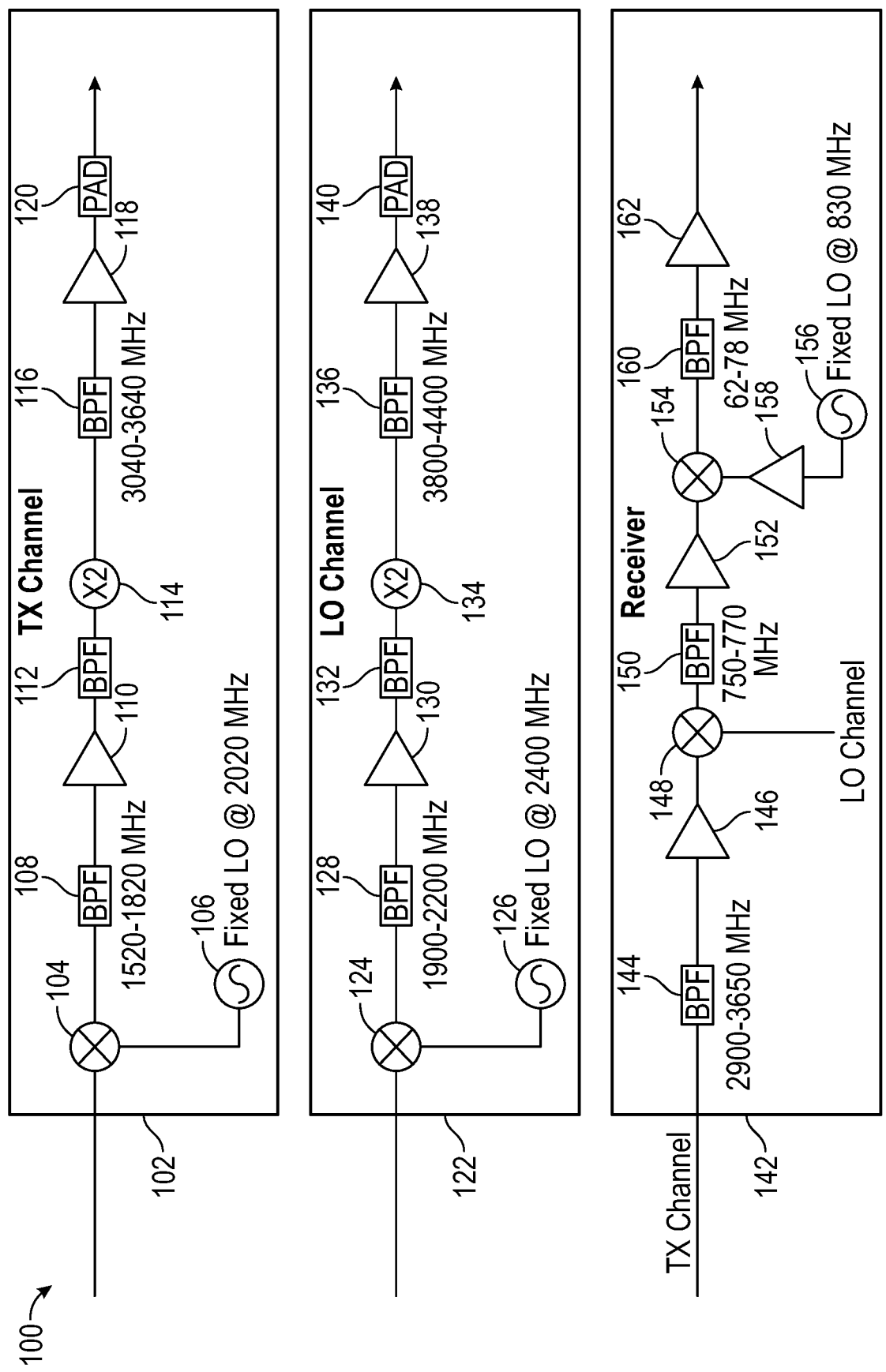
FIG. 1 illustrates an example of a digital radar system including two digital receiver channels that mitigate a directional source of interference using adaptive beamforming.

In the context of the prevailing global security challenges, portable surveillance applications are becoming increasingly important. Security applications have become one of the main segments in the fifth generation (5G) Internet-of-Things and the Year 2020 50-Billion Connected Devices concept. The field of radar technology is arguably at the forefront for enabling such applications.

In light of the above applications and requirements, the miniaturized digital radar system disclosed herein includes a miniaturized on-chip integration radar system that can facilitate the development of portable monitoring systems for security related systems. The miniaturized digital radar system is particularly well suited for airspace monitoring. Not only does the high bandwidth enable target identification, the multiple channels can be used to perform adaptive beamforming which enables tracking of targets of interest in the presence of intentional or unintentional interference. Moreover, the miniaturized digital radar system can form the basis of fielded systems integrated on maritime vessels and fixed/rotary wing aircraft. Integration on maritime vessels is appropriate for applications involving detection of targets at far distances and relatively high altitudes. Integration on aircraft is appropriate for detection of low altitude targets. In particular, pulsed mode operation can allow for application of space time adaptive processing algorithms which have the ability to detect slow, low altitude targets against challenging clutter/interference environments, such as detection/tracking of vehicle convoys.

Modern naval surveillance systems often are required to operate in a variety of challenging environments in electromagnetic maneuver warfare. To facilitate this, it is advantageous for such systems to have:

High range resolution, which provides information on the spatial distribution of target reflectivity, and can be useful in determining the features of an extended target High dynamic range, which is needed to detect targets that could be obscured by clutter in littoral regions Multiple digital receiver channels, which allow for the adaptive rejection of directional sources of interference such as jamming The miniaturized digital radar system exhibits all of these characteristics with an extremely compact form factor. This physical compactness allowed the miniaturized digital radar system to be used on small mobile platforms such as UAVs. The miniaturized digital radar system can be used in long-range surveillance applications, such as shoreline policing, desert security, traffic safety monitoring, and airport perimeter security.

The miniaturized digital radar system is particularly well suited for airspace monitoring. Not only does the high bandwidth enable target identification, the multiple channels can be used to perform adaptive beamforming which enables tracking of targets of interest in the presence of jammers. Moreover, the miniaturized digital radar system can form the basis of fielded systems integrated on maritime vessels and fixed/rotary wing aircraft. Integration on maritime vessels is appropriate for applications involving detection of targets at far distances and relatively high altitudes. Integration on aircraft is appropriate for detection of low altitude targets.

In particular, pulsed mode operation can allow for applications which have the ability to detect slow, low altitude targets against challenging clutter/interference environments, such as detection/tracking of vehicle convoys and low flying drones.

Higher range resolution helps radar systems to resolve two targets that are closely spaced in range, allowing for distinction between scattering signals originating from separate targets or from a larger extended target. Compared to low resolution profiles in which a target may be confined to a single range gate, high-resolution profiles provide information on the spatial distribution of target reflectivity. This can be useful in distinguishing closely spaced targets or in determining the features of an extended target.

Moreover, higher Dynamic helps radar systems to determine the difference between weak signals from one target to a stronger signal from another target without driving the system into nonlinearity. High dynamic range is important for operation in high-clutter environments such as littoral regions, wherein a weak target could be potentially masked by a large clutter reflection.

Multiple transceiver channels or an antenna array enables an antenna system to perform beamforming. Such beamforming can enable focusing signal strength to a particular angular region in space while rejecting signals originating from outside the region. This is useful in practical scenarios, wherein the radar rejects a jammer signal coming from a certain angular location in order to maintain a track on a target or interest in another angular region.

Traditional systems are generally based on using the matched-filter receiver architecture. An inherent problem when designing a digital radar using a matched-filter receiver architecture is that the usage of wideband waveforms (for high range resolution) necessitates high-speed ADCs due to the Nyquist theorem. This approach as such not only generates large amounts of data but also reduces the overall system dynamic range, thereby offsetting the improvement gained by moving the digitization stage closer to the array face. Moreover, traditional systems use bulky and very large size radars at S-band that are often times over 10 feet high.

As described herein, the present disclosure relates to a high performance miniaturized digital radar system with high dynamic range (>70 dB) and low system noise floor (less than −70 dBm). The miniaturized radar system can be fabricated on a Printed Circuit Board (PCB) and/or a chip, such as on a System-On-a-Chip (SOC) resulting in a small form factor. The small form factor of the miniaturized digital radar system on the PCB and/or the SOC can be implemented on small and/or low-observable platforms, such as on fixed or rotary wing unmanned aerial vehicles. The digital radar system can operate at the S-band (e.g. in the range of 3 GHz). Advantageously, the S-band frequency range is less susceptible and/or not susceptible to clutter from precipitation and is well suited for long range surveillance applications. Moreover, the miniaturized digital radar system employs a more efficient design that uses far less components as described further herein.

Overview of the Miniaturized Digital Radar System

FIG. 1 illustrates an example of a digital radar system 100 including two digital transceiver channels that mitigate a directional source of interference using adaptive beamforming. The Transmit Channel (TX Channel) 102 can up-convert baseband chirp signals to S-bands. Intermodulation (IMO) products are mitigated by employing a two-stage up-converter that includes a mixer and a frequency doubler. In addition, suitable band pass filters (BPFs) arc utilized after each up-conversion stage to capture the frequency bands of interest and reject the others.

In some embodiments, the Transmit Channel (TX Channel) 102 can include a mixer 104 to upconvert a chirp signal generated by the local oscillator 106 at 2020 MHz to the S-band, and one or more filters to filter the signal to bands of interest. The chirp signals can be Low Frequency Modulated (LFM) chirp signals of 300 MHz instantaneous bandwidth (or between 200-500 MHz) with approximately 100 microseconds and 0 dBm of power. The TX Channel 102 can include a bandpass filter 108 to filter signals outside of certain frequencies, such as between 1520-1820 MHz. The TX Channel 102 can include a first amplifier 110, a second bandpass filter 112, a frequency multiplier 114, a third bandpass filter 116 to filter signals outside of 3040-3640 MHz, a second amplifier 118, and a pad 120 to pad the output of the second amplifier 118. The frequency multiplier 114 multiplies the output of the second bandpass filter 108 that includes signals between 1520-1820 MHz by a factor, such as 2, to generate an output with signals between 3040-3640.

In some embodiments, the first bandpass filter 108 comprises an interdigital filter. Due to the grounded quarter-wavelength-long resonators, the interdigital filter used for the first stage of the up-converter via the mixer 104 pushes the first spurious response of the interdigital filter to be about three times of its fundamental resonant frequency (at $3f_o$) and the second resonant frequency (at $2f_o$) is suppressed by or at least approximately 20 db.

Fractional bandwidth of the interdigital filter can be limited because of the high coupling requirements between the adjacent resonators. The maximum achievable coupling between the resonators is restricted by the minimum allowable space in the fabrication process. Due to this fact, interdigital filter may not be practical for the second stage filtering by the frequency multiplier 114 of TX-LO channels where the signal bandwidth is larger. Thus, bandpass filter 116 can comprise a hairpin filter, where the amplifiers do not amplify those higher frequency bands due to their limited operational bandwidth, and thus, the higher harmonic suppression of the filter is not critical.

In some embodiments, the digital radar system 100 can include a Local Oscillator (LO) Channel 122. The output of the Local Oscillator (LO) channel 122 can drive the first mixer 148 in the Receive Channel (RX Channel) 142. The LO Channel 122 can include a fixed local oscillator generating a signal at 2400 MHz. The LO Channel 122 can further include a mixer 124, a first bandpass filter 128 to filter signals at 1900-2200 MHz, a first amplifier 130, a second bandpass filter 132, a frequency multiplier 134, a bandpass filter to filter signals at 3800-4400 MHz, an amplifier 138, and a pad 140 to pad the output of the second amplifier 138. The frequency multiplier 134 multiplies the output of the second bandpass filter 132 that includes signals between 1900-2200 MHz by a factor, such as 2, to generate an output with signals between 3800-4400.

In some embodiments, the LO channels have a different frequency of operation and an additional amplification stage than the TX channel. This difference in frequency can be set to approximately 760 MHz. The output of the TX channel and LO channels can include chirps that span the frequencies of 3040-3640 and 3800-4400 MHz (with 600 MHz instantaneous bandwidths) with power levels of 7.2 and 20 dBm, respectively. The output power of the LO channel can be suitable to drive the first mixer of the RX channel for stretch processing, which can include a passive mixer with a minimum drive-level requirement of 10 dBm.

In some embodiments, the digital radar system 100 can include a Receiver (RX) Channel 142. The RX Channel 142 can include two down-converter stages to reduce image frequency issues and reduce LO Channel leakage. A stretch processing technique can be applied to the first down-converter stage. The stretch processing technique is applied to a wideband 600 MHz Low Frequency Modulated (LFM) chirp signal to achieve high range resolution. As such, the components in the transceiver operate in the linear region below compression to avoid saturation and to attain high dynamic range.

In some embodiments, Stretch processing is used to obtain a high-resolution range profile for a target that has already been acquired and tracked. The approximate range of the target is thus assumed to be known, and the LO channel signal is released at a time that coincides with the expected arrival of the reflected target signal at the receiver. The IF filter is then used to limit the bandwidth of the dechirped signal (and thus lower the resulting sampling rate requirements). The bandwidth of the IF filter governs the width of the range window around the actual target range. The maximum detection range of the system depends on the target Radar Cross Section (RCS) as well as the amplifier and antenna gain, and the high dynamic range (>70 dB) and low system noise floor (less than −70 dBm) are consistent with requirements for high-range detection of stealthy targets in high clutter environments. Thus, the digital radar system 100 is ideal for long range surveillance.

In some embodiments, the RX Channel 142 can include two down-converter stages to reduce Intermodulation Distortion (IMD), where the echo chirp from the target and the reference LO chirp signals are mixed.

In some embodiments, the RX Channel 142 can include a first bandpass filter 144 to filter signals at 2900-3650 MHz, a first amplifier 146, a first mixer 148, a second bandpass filter to filter signals at 750-770 MHz in order to reject higher sideband chirp and passes the lower sideband product for the target range, a second amplifier 152, a second mixer 154, a bandpass filter 160 to filter signals at 62-78 MHz, and a third amplifier 162.

In some embodiments, the RX Channel 142 can include a fixed local oscillator that generates a signal at 830 MHz, and a fourth amplifier 158 that feeds into the second mixer. As noted above, the first mixer 148 in the Receive Channel (RX Channel) 142 can receive a signal from the output of the Local Oscillator (LO) channel 122 to mix with the output of the first amplifier 146. The first mixer 148 can comprise a passive mixer.

In some embodiments, the first bandpass filter 144 can include a capacitively coupled bandpass filter. Such a filter can be beneficial in this application due to its narrow bandwidths, reducing the number of inductors for the filter. In some embodiments, the second bandpass filter 150 can include Stepped-Impedance Resonators (SIRs) to attain the parallel L-C resonators in the first bandpass filter 144.

Figure 2A:
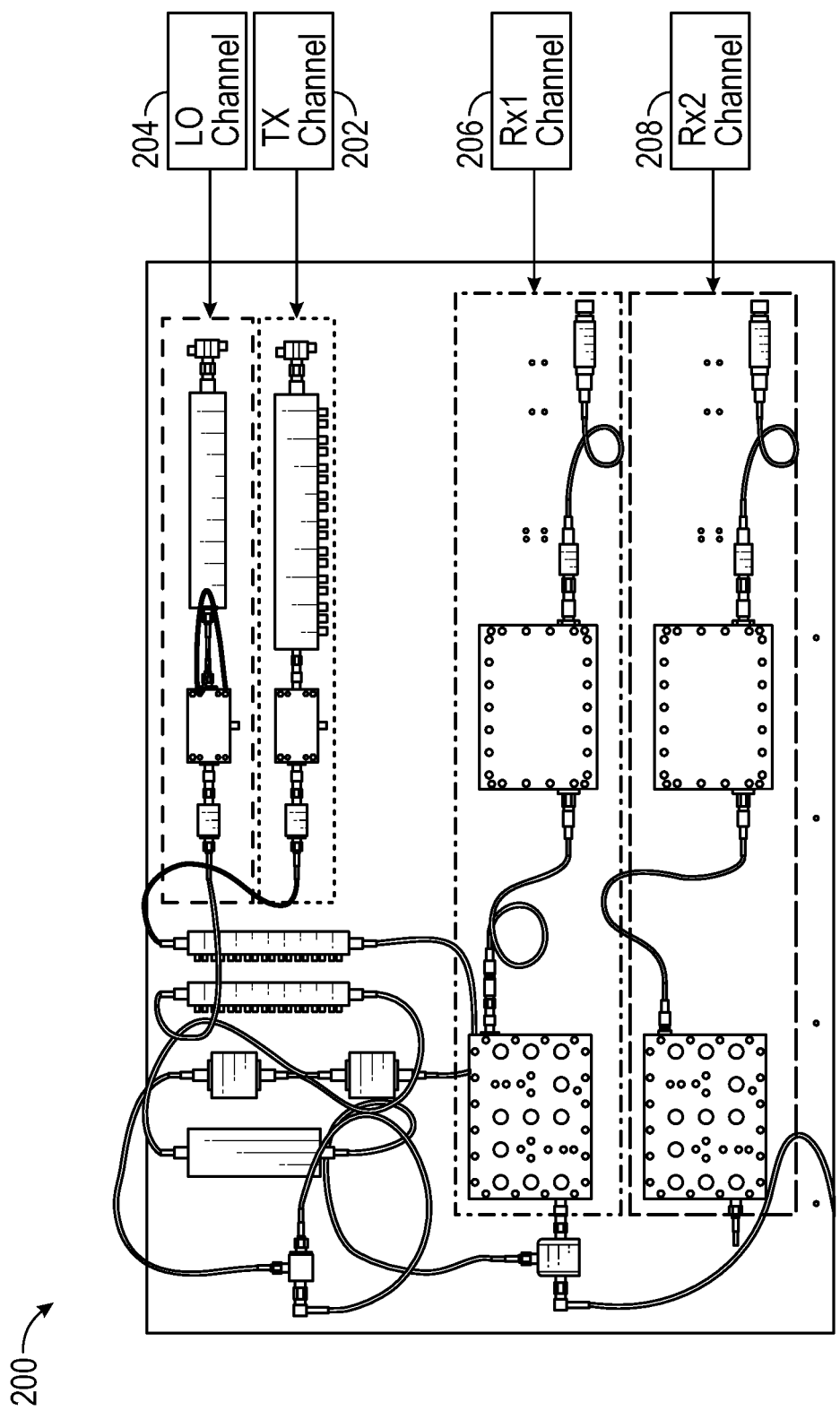
FIG. 2A illustrates a radar system architecture using lumped microwave components.

FIG. 2A illustrates a radar system architecture 200 using lumped microwave components. The lumped microwave components can include filters external to the PCB board which can be relatively larger in size and consume more power than filters fabricated onto the PCB board. The radar system can include a single transmit channel 202 that preclude transmit beamforming that concentrates the transmitted signal energy in a particular direction. The radar system architecture 200 can include one or two receiver channels 206, 208 that can limit the number of interfering sources that the radar system can handle. Moreover, the radar system can include external oscillator sources, such as the LO channel 204, that are not integrated onto the PCB and/or the chip.

Figure 2B:
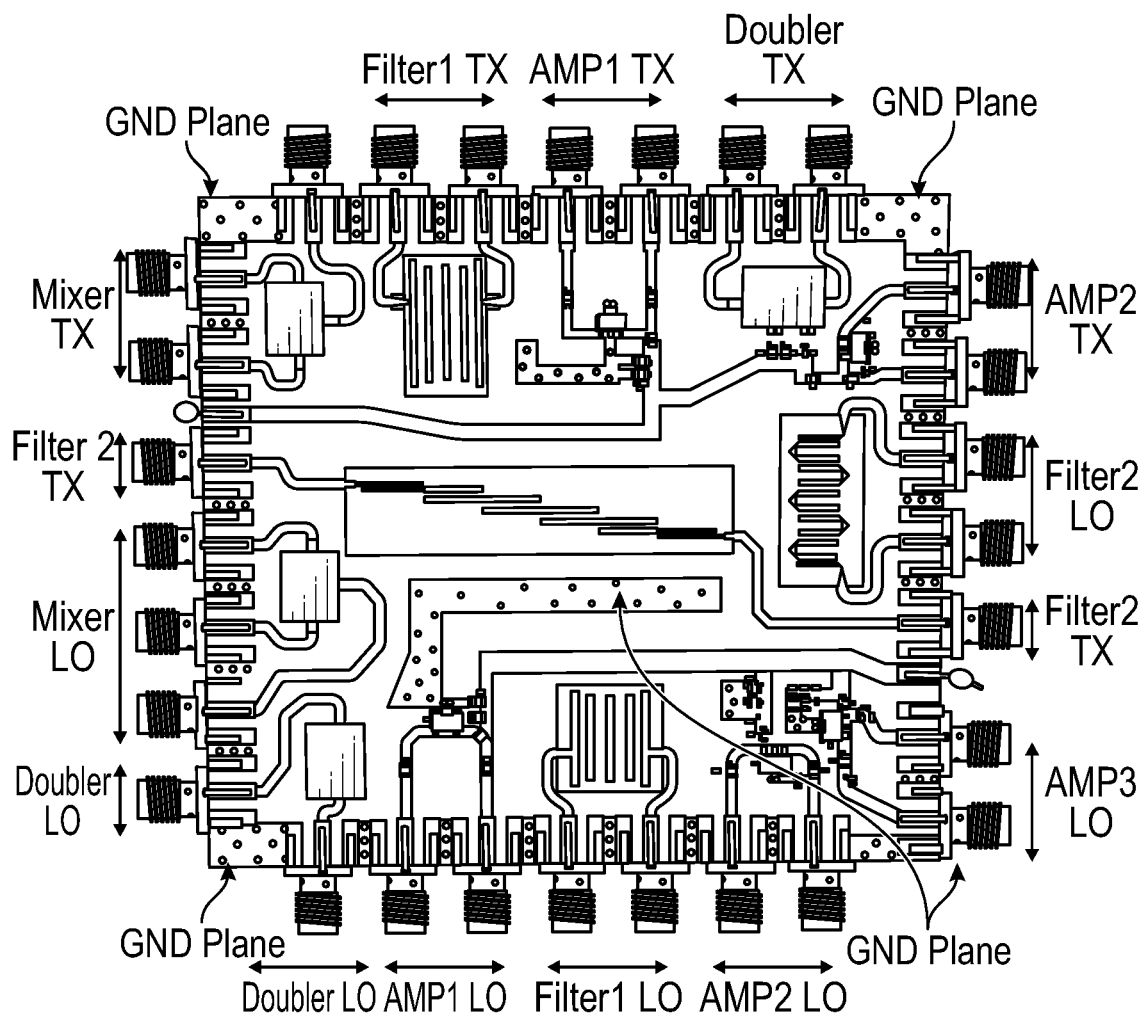
FIGS. 2B and 2C illustrate a miniaturized digital radar system that can include architecture fabricated onto a single Printed Circuit Board (PCB), according to some embodiments.
Figure 2C:
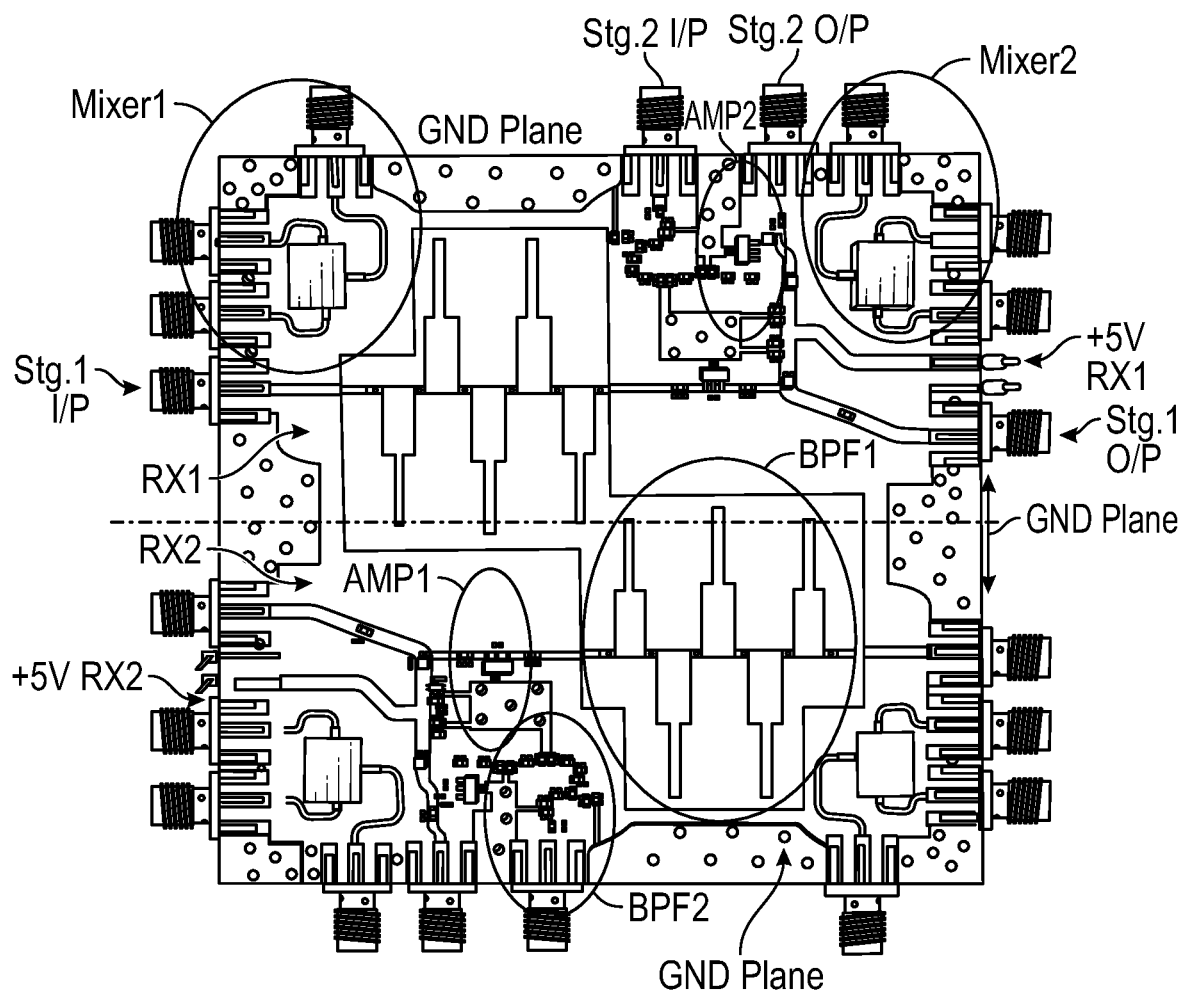

FIGS. 2B and 2C illustrate a miniaturized digital radar system that can include architecture fabricated onto a single PCB, according to some embodiments. In some embodiments, the miniaturized digital radar system can include multiple transmitter channels and multiple receiver transmitter channels fabricated on a single printed circuit board (PCB) and/or a single chip. In some embodiments, the miniaturized digital radar system exhibits superior performance on the PCB than that of the much larger lumped microwave component system of FIG. 2A, where the miniaturized digital radar system of FIG. 2B achieved >60 dB of dynamic range over 500 MHz of instantaneous bandwidth of the waveform emitted by the transmitter. The wider bandwidth enables the radar to distinguish between closely spaced targets, such as for drone detection or airplane detection.

Multiple Transmitter and Receiver Channels on a Single PCB or Chip

Figure 3:
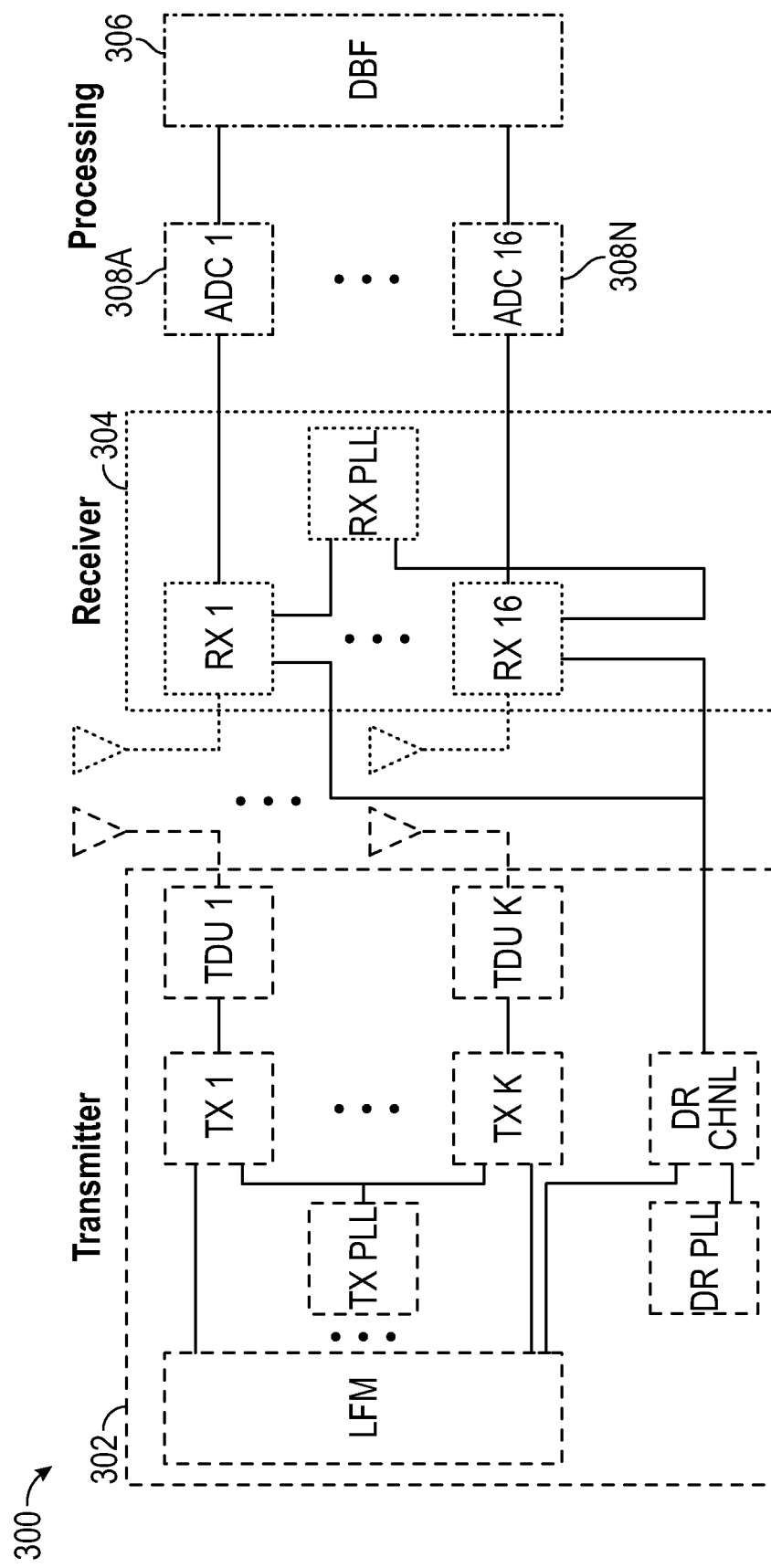
FIG. 3 illustrates an example of a miniaturized digital radar system with multiple transmitter and receiver channels on a single PCB and/or a single chip according to some embodiments.

FIG. 3 illustrates an example of a miniaturized digital radar system 300 with multiple transmitter and receiver channels on a single PCB and/or a single chip according to some embodiments. The miniaturized digital radar system can include a transmitter system 302, a receiver system 304, and/or a processing system 306.

In some embodiments, the miniaturized digital radar system can include the transmitter system 302, the receiver system 304, a processing system 306 including a microcontroller, and an analog-to-digital circuit 308A, 308N shown in FIG. 3 to be fabricated onto a single PCB.

Advantageously, the miniaturized digital radar system can significantly reduce the size and power consumption of the radar system. Moreover, the miniaturized digital radar system can achieve similar radar performance as the system in FIG. 2(*a*), but with lower noise and linearity criteria for the receiver for larger dynamic range, lower power consumption for the transmitter, and a smaller form factor. The miniaturized digital radar system can operate on a low voltage power supply with a low power consumption, such as less than a milli-watt.

In some embodiments, the miniaturized digital radar system can include filters fabricated onto the PCB and/or the chip. Advantageously, the miniaturized digital radar system may not require and/or may reduce the required numbers of external filters. In some embodiments, the fabricated filters can include one or more interdigital filters, filters coupled in parallel, line filters, hairpin filters, and/or the like. The filters on the PCB or the chip can include passive filters that require less or no power consumption. Moreover, because the filters are printed onto the PCB, this improves speed of manufacturing, reduces costs as the costs are absorbed in the cost of the PCB fabrication, and are manufactured in the same fabrication process reducing errors of component integration.

Figure 4A:
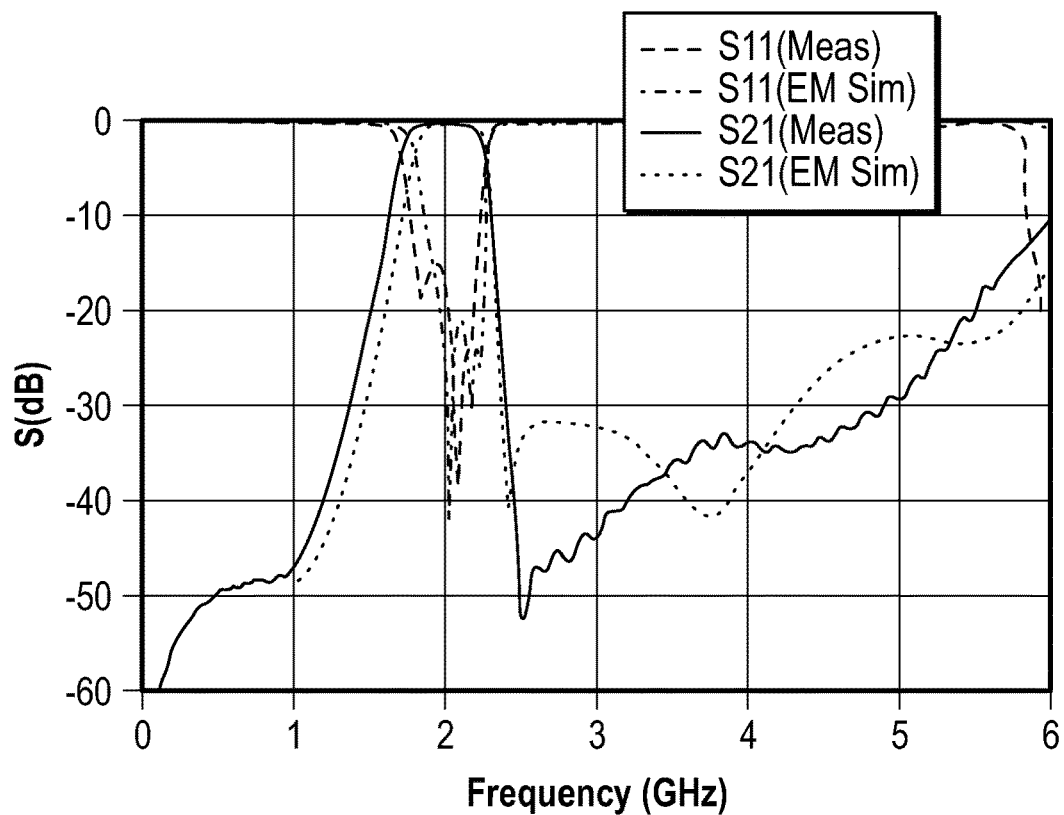
FIG. 4A illustrates a filter response over gigahertz (GHz) frequencies for a miniaturized digital radar system that includes filters fabricated onto the PCB and/or the chip according to some embodiments.
Figure 4B:
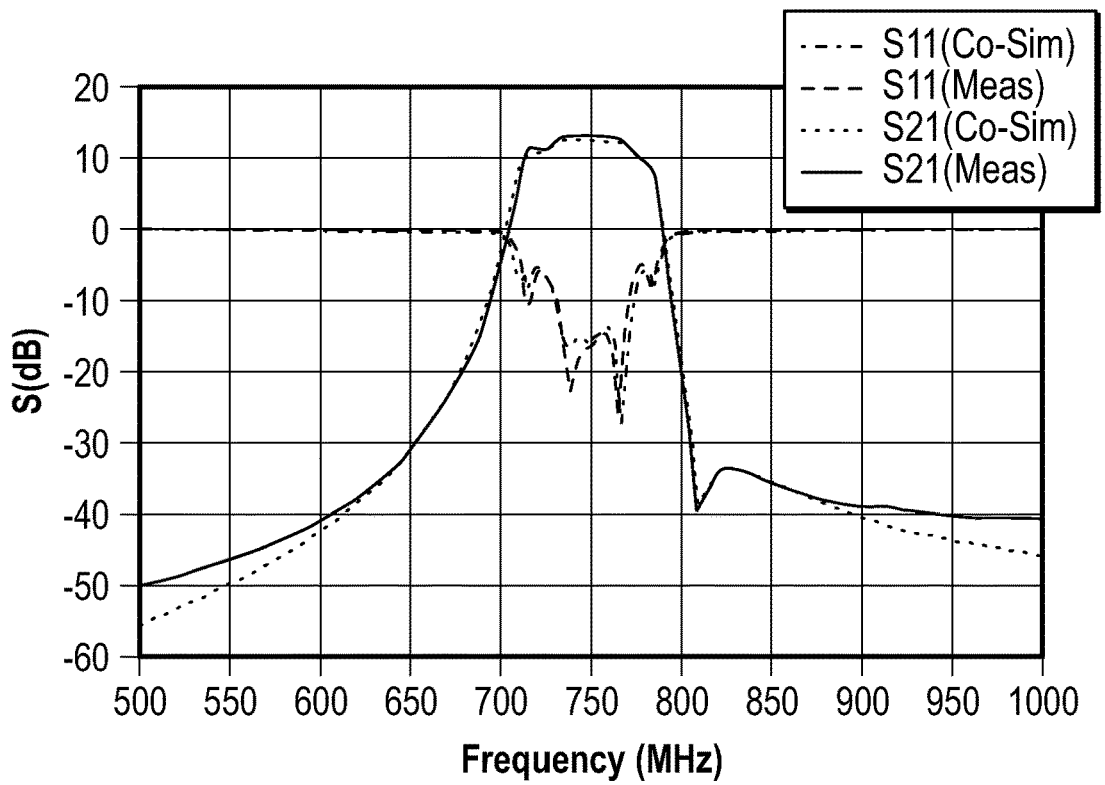
FIG. 4B illustrates a filter response over megahertz (MHz) frequencies for a miniaturized digital radar system that includes filters fabricated onto the PCB and/or the chip according to some embodiments.

FIG. 4A illustrates a filter response over GHz frequencies for a miniaturized digital radar system that includes filters fabricated onto the PCB and/or the chip according to some embodiments. FIG. 4B illustrates a filter response over MHz frequencies for a miniaturized digital radar system that includes filters fabricated onto the PCB and/or the chip according to some embodiments. FIGS. 4A and 4B illustrates improved performance of the PCB printed filters. The S21 insertion reduces to a minimum (close to 0 dB) between 1.5-2.5 GHz with center frequency at around 2 GHz. The graphs illustrate a sharp skirt selectivity (S21) and adequately cover the bandwidth of the IF channels. The graphs also show that the rejection in out-of-band range is improved (S11). This ultimately helped in improving the dynamic range of the entire radar receiver.

In some embodiments, the miniaturized digital radar system can include multiple channels that can be integrated onto a single PCB and/or onto a single chip, as shown in FIG. 3. Each transmitter channel, such as TX 1 and TX K, can emit a frequency modulated signal with >500 MHz bandwidth that will allow for the distinction of targets with a physical spacing of <25 cm. Advantageously, the multiple channels can enable the miniaturized digital radar system to perform transmit beamforming in order to concentrate the transmitted signal energy to a particular region of interest.

In some embodiments, each transmitter channel can include a programmable time delay unit (TDU), such as TDU 1 and TDU K. Advantageously over a phase shifter, the programmable time delay unit can process a large signal bandwidth, such as a signal of >500 MHz, for the miniaturized digital radar system. By selecting an appropriate delay for each unit, the miniaturized digital radar system can radiate a signal that can be steered for effective transmit beamforming, thus enabling the rapid scanning of large spatial regions. The TDUs can be adjustable by a controller for beam steering.

In some embodiments, the miniaturized digital radar system can include multiple receiver channels. For example, the miniaturized digital radar system can include 16 receiver channels, such as RX1 and RX 16. Advantageously, the miniaturized digital radar system processes a much larger number of interfering sources than a miniaturized digital radar system with one or two receiver channels. Moreover, the miniaturized digital radar system can perform receiver digital beamforming.

In some embodiments, the miniaturized digital radar system can include a low-IF receiver architecture to effectively convert a wide bandwidth frequency modulated signal to a set of narrowband tones. The signal is down-converted into a low-IF frequency. The image can be sometimes higher in magnitude than desired and, therefore, polyphase filters with high image suppression can used. Here for the PCB, the designed filters can offer Signiant rejection. The interface to base-band can either be at IF requiring the use of high-bandwidth ADC or using an additional mixer and PLL to mix down to IQ signal. Advantageously, the miniaturized digital radar system can significantly reduce the bandwidth that needs to be digitized, such as reducing the required bandwidth from over 1 GHz to tens of MHz. This is especially advantageous given the increased amount of data that will be generated with the multiple receiver channels.

In some embodiments, the miniaturized digital radar system can include an oscillator source, such as a data receiver (DR) phase lock loop (PLL), fabricated directly onto the PCB and chip. The DR phase lock loop can feed the generated signal to a DR Channel that is then transmitted to the first mixer of the receiver channels.

Phase Lock Loop Architecture

Figure 5:
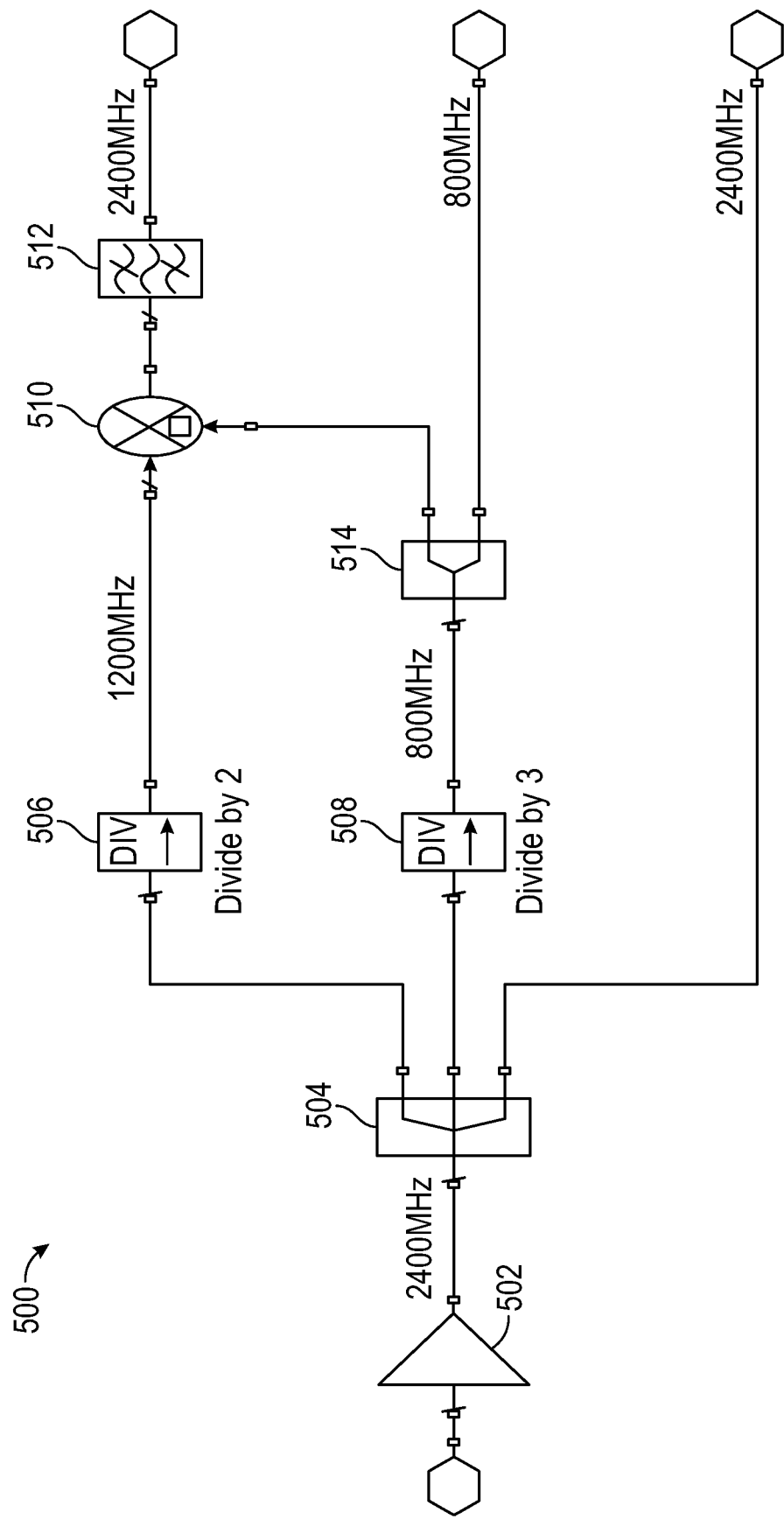
FIG. 5 illustrates an example of a phase lock loop (PLL) architecture integrated and fabricated onto a PCB, according to some embodiments.

FIG. 5 illustrates an example of a phase lock loop (PLL) architecture 500 integrated and fabricated onto a PCB, according to some embodiments. The miniaturized digital radar system can include one or more amplifiers and/or power splitters that can be used to maintain certain power levels for the operation of the radar. The miniaturized digital radar system can include three PLLs.

In some embodiments, the PLL architecture 500 can generate an oscillator signal, such as a 2.4 GHz signal and/or a 500 MHz signal. The PLL architecture 500 can include an amplifier 502 that amplifies the originally generated signal. The PLL architecture 500 can include a first power splitter 504 to split the amplified signal to a plurality of different paths.

In some embodiments, the PLL architecture 500 can include one or more frequency dividers, such as the dividers 506, 508, to divide the oscillator signal into two and/or three signals. The PLL architecture 500 can mix the output of the first divider 506 with the output of the second divider 508 via a mixer 510. The output of the mixer 510 can be filtered via a bandpass filter 512 to output a 2400 MHz signal. Advantageously, the 2400 MHz signal can be filtered and up-converted to reduce the amount of noise in the receive channels. The 2400 MHz signal output of the bandpass filter 512 can be sent to the receive channels.

In some embodiments, the output of the second divider 508 can also be split via a second power splitter 514. The split signal can be transmitted to the mixer 510 and outputted out of the PLL architecture 500 at 800 MHz. In some embodiments, one of the outputs for the first power splitter 504 can be outputted from the PLL architecture 500 at 2400 MHz. The 2400 MHz output of the first power splitter 504 can be sent to the LO channel.

(1) TX PLL: This can be used to synchronize the channels that transmit the wideband waveform.

(2) DR PLL: The LO can generate a chirp signal ("dechirp") that is used to demodulate the wideband signal collected at the receiver.

(3) RX PLL: This can be used to synchronize the data collection at the receivers.

Figure 6A:
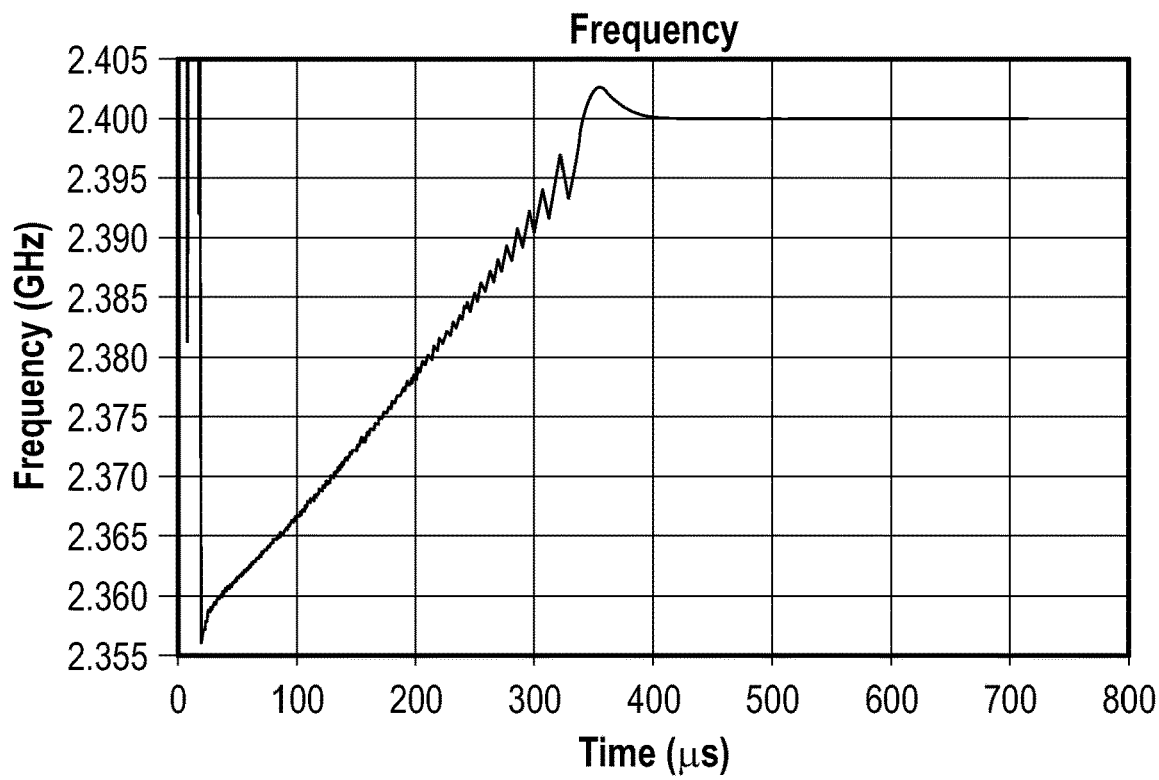
FIG. 6A illustrates simulated PLL architecture locking time for the PLL architecture of FIG. 5, according to some embodiments.

FIG. 6A illustrates a simulated PLL architecture locking time for the PLL architecture 500 of FIG. 5, according to some embodiments. The wide bandwidth of the PLL architecture enables faster locking time. The simulation illustrates that the PLL locking time to simultaneously synchronize all receivers at 2.4 GHz is 400 µs, where 1 ms is common in radar applications. Although higher bandwidth PLLs allow for faster locking times, it often comes at a cost of higher noise in the system. However, because the miniaturized digital radar system improves dynamic range in other aspects, the system is able to reach faster locking times of the receiver channels while maintaining other performance characteristics of the radar system.

Figure 6B:
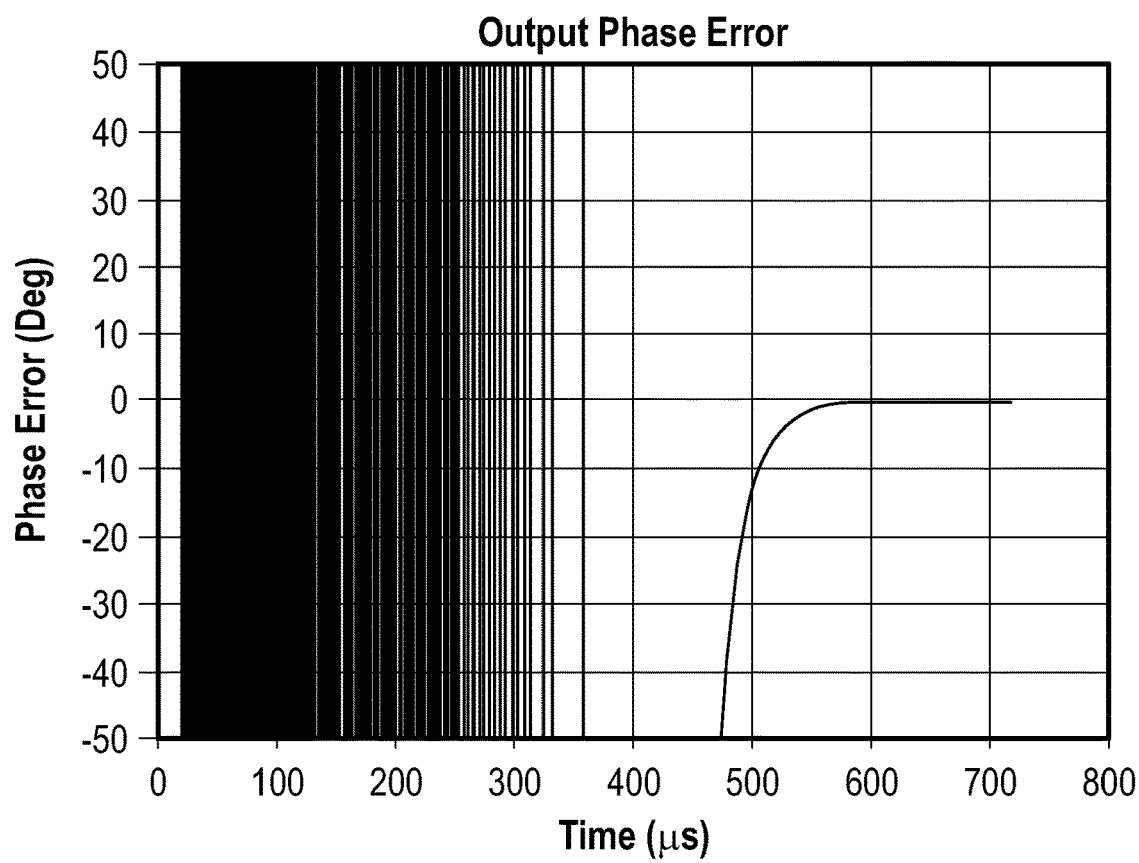
FIG. 6B illustrates simulated PLL architecture phase error for the PLL architecture of FIG. 5, according to some embodiments.

FIG. 6B illustrates simulated PLL architecture phase error for the PLL architecture of FIG. 5, according to some embodiments. The simulation illustrates that the phase error settles to approximately zero in about 600 us, which is well within the required or recommended locking time of less than 1 ms for typical radar applications. Furthermore, the noise power was approximately −85 dBc relative to the carrier signal, and the PLL did not produce any spurs within a 500 MHz span of the carrier frequency.

Improved Performance Over Jamming Signals

In some embodiments, the miniaturized digital radar system can include one or more receivers and one or more digital signal processors fabricated onto a single PCB and/or a chip. The receivers can include mixers that can mix a received signal from the received RF input frequency at the antenna to a low-IF baseband. The receiver output can be digitized by an Analog-to-Digital Converter (ADC) at a sub-Nyquist rate. The ADC can be fabricated onto the single PCB or chip of the miniaturized digital radar system.

Figure 7:
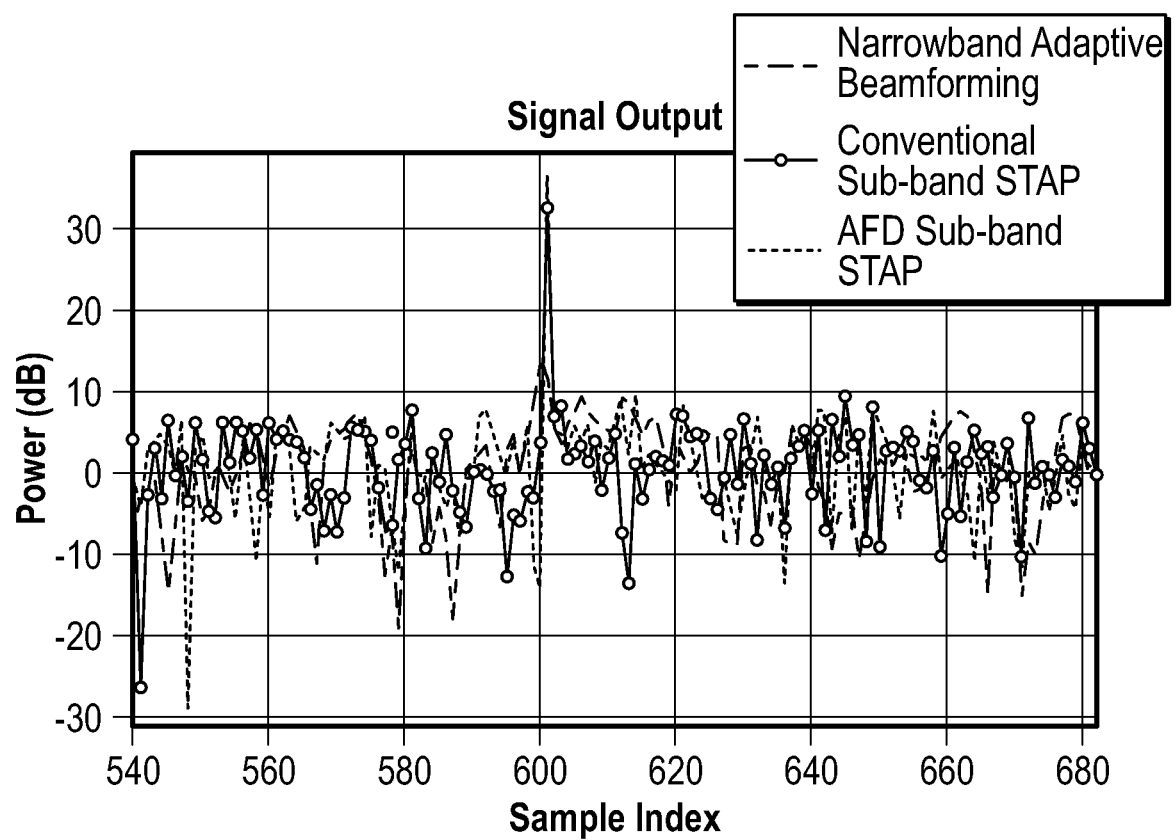
FIG. 7 illustrates simulation results of a beamforming algorithm for the miniaturized digital radar system of FIG. 3, according to some embodiments.

In some embodiments, the miniaturized digital radar system can perform adaptive beamforming that can allow the radar to detect targets in the presence of interference, such as strong jamming. FIG. 7 illustrates simulation results of beamforming for the miniaturized digital radar system of FIG. 3, according to some embodiments. The miniaturized digital radar system can adjust the beamforming to increase the robustness of potential variations in the receiver channels and/or a rapidly changing interference environment. In some embodiments, the beamforming is processed external to the single PCB and/or the single chip, such as on a Field Programmable Gate Array (FPGA).

FIG. 7 demonstrates the anti-jamming capability of the system. A target can be detected in the presence of a directional source of interference. The digital channels can be used to perform adaptive digital beamforming in order to cancel out the jamming. This can be done is several ways, as shown in the three graphs in FIG. 7. The "Narrowband adaptive beamforming" signal corresponds to a beamforming method. Note that there is no discernible target peak. The other signals both exhibit a pronounced peak, indicating the presence of a target. This demonstrates the ability of these two methods to detect a target over the "Narrowband adaptive beamforming" technique.

In some embodiments, the transmitter system and the receiver system of the miniaturized digital radar system can be fabricated onto a single PCB and/or a single chip. Advantageously, the size of the chip for the miniaturized digital radar system can be relatively small and consumer low power, relative to other similarly performing radar systems. The miniaturized digital radar system can be installed onto smaller devices, such as into mobile systems or portable handheld devices. The miniaturized digital radar system can perform similar or better to other high-performance radar systems but at an unprecedented miniaturized scale size to about 10 cm by 10 cm or 5 by 5 cm.

In some embodiments, the miniaturized digital radar system can employ a frequency modulated signal for transmission and reception of a reflection signal from a potential target within the range of interest. The miniaturized digital radar system can process the received signal via an inherently low energy Low-IF transceiver. Advantageously, the transceiver system of the miniaturized digital radar system can use the coupling between time and frequency that exists in frequency modulated signals, allowing for constant envelope circuit architectures, that enables the transceiver amplifiers and mixers at the RF front-end to operate at higher efficiencies, resulting in significant energy savings for the miniaturized digital radar system.

Another advantage of the Low-IF transceiver of the miniaturized digital radar system is that it can dramatically reduce the width of the target frequency band without sacrificing range resolution, thereby circumventing the requirement of a demanding sampling rate in excess of 1.2 GHz (as dictated by the Nyquist theorem). This reduced sampling rate facilitates a significant reduction in memory and storage requirements on the chip. In order to resolve two closely spaced targets, a wideband waveform can be used. This is because targets that have a small spatial separation will be received with a small time separation, which can only be distinguished using a wideband signal.

When digitizing the received signal, the Shannon/Nyquist theorem can dictate that a wideband signal is to be sampled at a very fast rate, thus generating large amounts of data. One way to overcome this dilemma is to focus on a given spatial region of interest rather than the entire unambiguous target range. By narrowing the focus to a particular range window, the required sampling rate can be proportionally reduced.

Improved Performance Over Jamming Signals Using Multiple Layers

Figure 8:
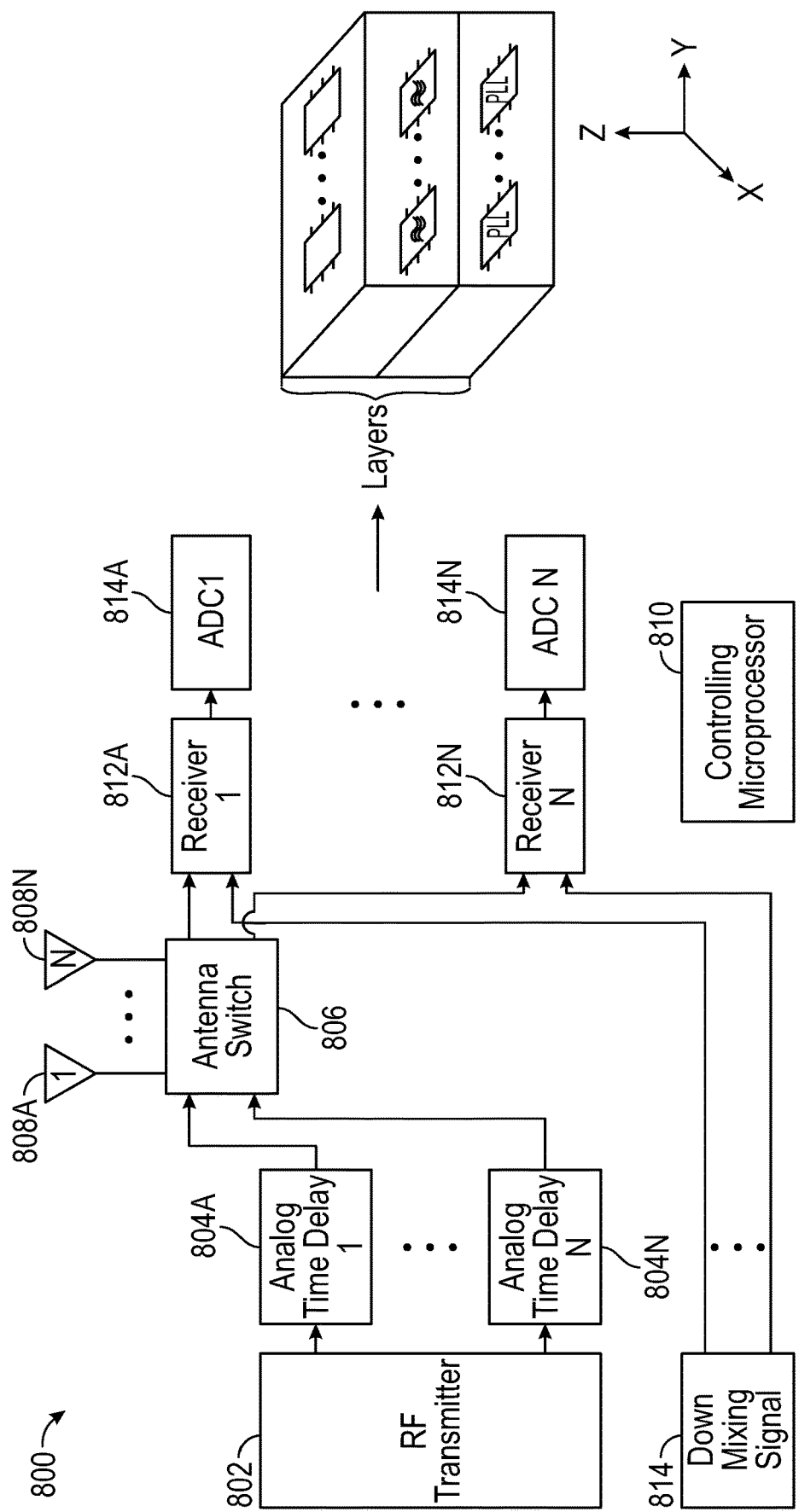
FIG. 8 illustrates a block diagram of processing chains fabricated on a chip of the miniaturized digital radar system according to some embodiments.

FIG. 8 illustrates a block diagram 800 of processing chains that can be fabricated on a chip of the miniaturized digital radar system according to some embodiments. The chip can include one RF transmitter 802, the output of which is connected to multiple analog time delay blocks 804A, 804N (collectively referred to herein as time delay blocks 804). Each time delay block 804 feeds to an antenna port, 808A, 808N, through an integrated multiple-pole multiple-throw antenna switch block 806, enabling wideband transmit beam steering.

In some embodiments, an integrated microprocessor 810 of the miniaturized digital radar system can digitally perform switching. The antenna switch 806 can connect to a plurality of receivers 812A, 812N (collectively referred to herein as receivers 812). The receivers 812 can be connected to an integrated Local Oscillator (LO) that generates a down mixing signal 814 that feeds to mixers in the received RF input from a frequency received at the antenna to Low-IF baseband. The receiver output can be digitized by ADCs 814A, 814N at a sub-Nyquist rate.

In some embodiments, the IF filtering can be fabricated onto a receiver chip and/or PCB of the miniaturized digital radar system. Advantageously, the IF filtering is not performed external to the PCB or chip, such as in FIG. 2(a), which would have increased the size of the radar system.

In some embodiments, multiple receiver layers can be stacked to create a multichip module (MCM) onto a single chip. In some embodiments, one layer includes the PPL architecture. In some embodiments, one layer includes the IF filtering. In some embodiments, one layer includes the receiver components. In some embodiments, a single layer can include components for one or more receiver channels. In some embodiments, one layer can include components for one or more transmitter channels. For example, the miniaturized digital radar system can include a multichip module that includes 16 layers each with a single receiver channel, one layer for a transmitter channel, one layer for the PLL, and one layer for the filters. In another example, the miniaturized digital radar system can include a multichip module that includes 8 layers each with two receiver channels, one layer for two transmitter channels, one layer for the PLL, and one layer for the filters. Advantageously, the chip can include a smaller form factor across the X/Y plane by utilizing the Z plane. Moreover, the multichip module architecture can cut cost and time of fabrication because the components of the miniaturized digital radar system can be fabricated on a single chip.

In some embodiments, the MCM can include multiple layers. The layers can comprise one or more receive channels, one or more PLL architectures, one or more transmit channels, one or more filters, and/or the like. A processor on the chip can determine which of the components and/or layers on the various layers to use. Advantageously, this can reduce form factor and fabrication cost as described herein.

To improve the radar anti jamming capabilities, the miniaturized digital radar system can include 16 different receivers. However the multiple receivers may not be able to all be integrated onto a single chip. Alternatively, the miniaturized digital radar system can include all chips on an MCM, where the system can include one receiver per chip.

Improved Performance Over Jamming Signals Using Multiple Layers

Figure 9:
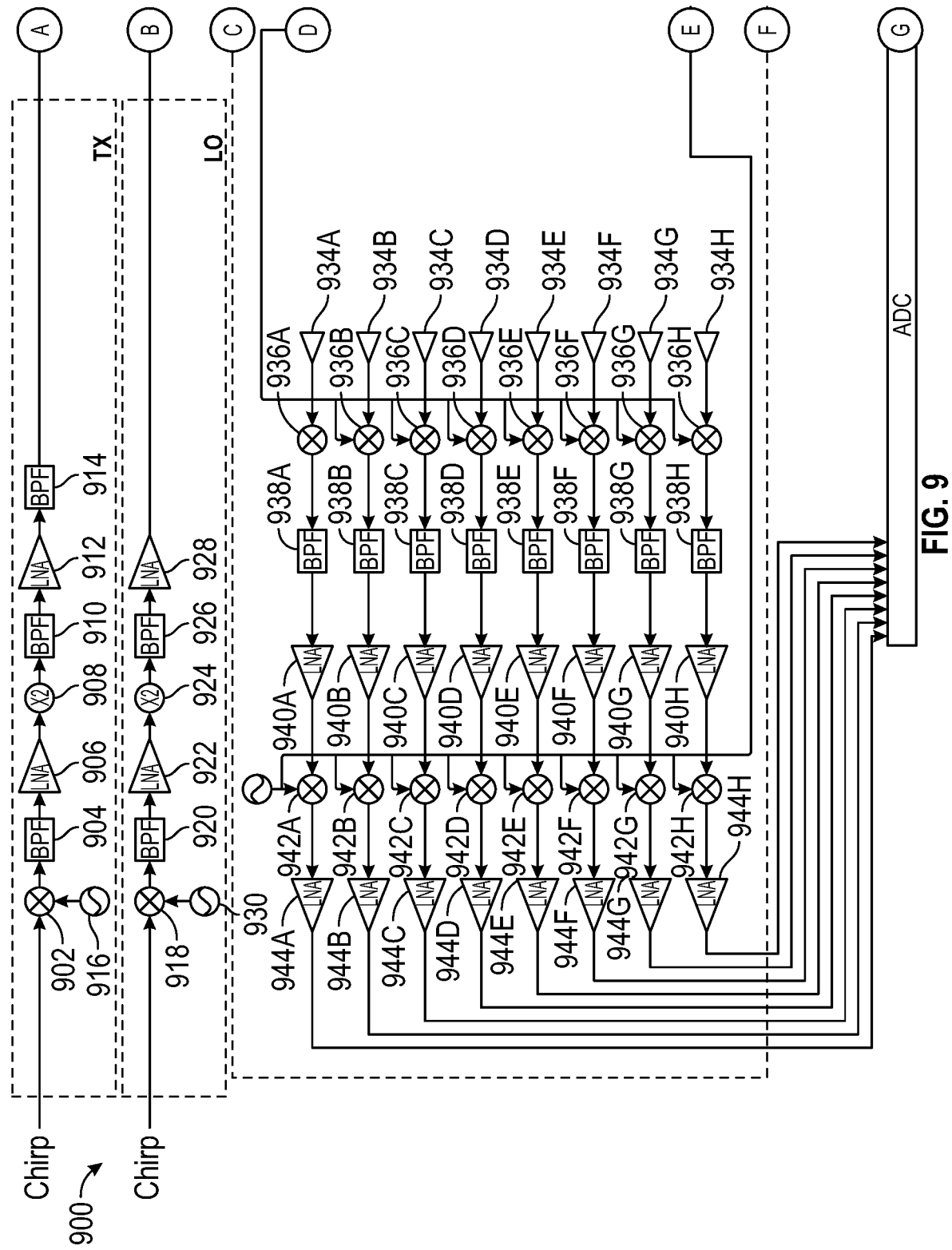
FIG. 9 illustrates a block diagram 900 of a single transmit channel and 16 receive channels fabricated on a single chip for the miniaturized digital radar system according to some embodiments.
Figure 9:
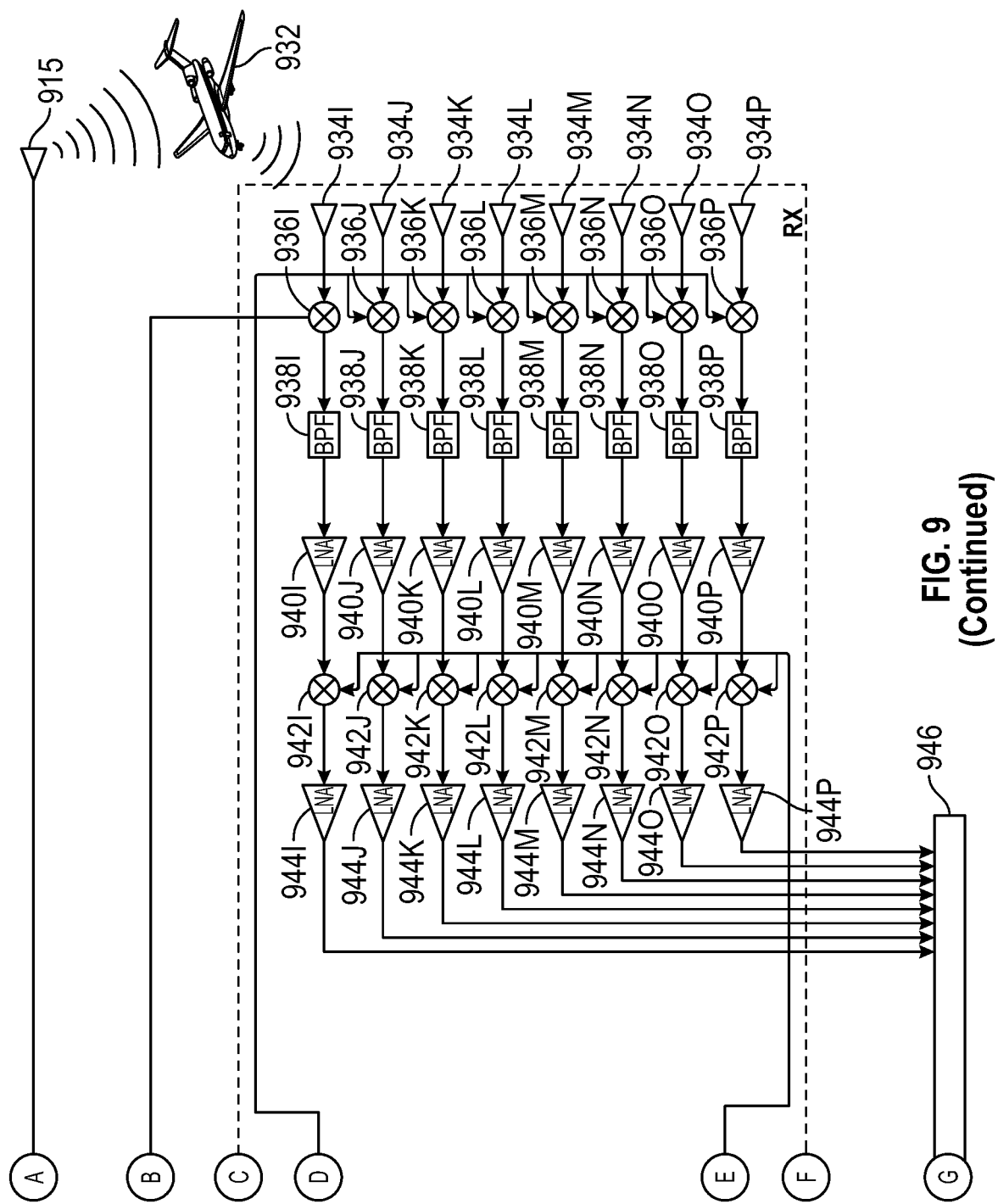

FIG. 9 illustrates a block diagram 900 of a single transmit channel and 16 receive channels fabricated on a single chip for the miniaturized digital radar system according to some embodiments. The block diagram 900 can include a transmit channel, multiple receive channels, a local oscillator channel, and an analog-to-digital converter (ADC) 946. The transmit channel (TX channel) can up-convert a baseband chirp signal to S-band frequency. The TX channel can include a mixer 902, a local oscillator 916, a first bandpass filter 904, a first low noise amplifier 906, a frequency doubler 908, a second bandpass filter 910, a second low noise amplifier 912, a third bandpass filter 914, and a transmit antenna element 915.

In some embodiments, the mixer 902 can mix the local oscillator signal from the local oscillator 916 and the chirp signal to upconvert the chirp signal. The first bandpass filter 904 can filter frequencies out of a certain range of frequencies, such as between 1520-1820 MHz. The first low noise amplifier 906 can amplify the output of the first bandpass filter 904. The frequency doubler can double the frequency of the output of the first low noise amplifier 906, such as from 1520-1820 MHz to 3040-3640 MHz. The second bandpass filter 910 can filter signals between another range of frequencies, such as 3040-3640 MHz. The second low noise amplifier 912 can amplify the output of the second bandpass filter 910. The third bandpass filter 914 can filter the output of the second bandpass filter 910 for a range of frequencies, such as 3040-3640 MHz.

In some embodiments, the transmit channel can transmit a signal from the antenna element 915, reflect off of an object, such as an airplane 932 or a drone, and be received by receiver channel antenna elements 934A, 934B . . . 934P (collectively referred to herein as antenna elements 934). In some embodiments, the antenna elements for the transmit channel, such as antenna element 915, are different than the antenna elements for the receive channel, such as 934. In some embodiments, at least a subset of the antenna elements for the transmit channels correspond to the antenna elements for receive channels using a switch. In some embodiments, at least a subset of the antenna elements for the receive channels correspond to the antenna elements for transmit channels using a switch.

In some embodiments, the output of the Local Oscillator (LO) channel can drive the first mixers 936A, 936B . . . 936P (collectively referred to herein as first mixers 936) in the Receive Channel (RX Channel). The TX channel can include a mixer 918, a local oscillator 930, a first bandpass filter 920, a first low noise amplifier 922, a frequency doubler 924, a second bandpass filter 926, and a second low noise amplifier 928.

In some embodiments, the plurality of receive (RX) Channels can each include two down-converter stages to reduce image frequency issues and reduce LO Channel leakage. A stretch processing technique can be applied to the first down-converter stage. The RX Channels can include antenna elements 934A, 934B . . . 934P (collectively referred to herein as antenna elements 934), first mixers 936A, 936B . . . 936P (collectively referred to herein as first mixers 936), bandpass filters 938A, 938B . . . 938P (collectively referred to herein as bandpass filters 938), first low noise amplifiers 940A, 940B . . . 940P (collectively referred to herein as first low noise amplifiers 940), second mixers 942A, 942B . . . 942P (collectively referred to herein as second mixers 942), and second low noise amplifiers 944A, 944B . . . 944P (collectively referred to herein as second low noise amplifiers 944).

Figure 10:
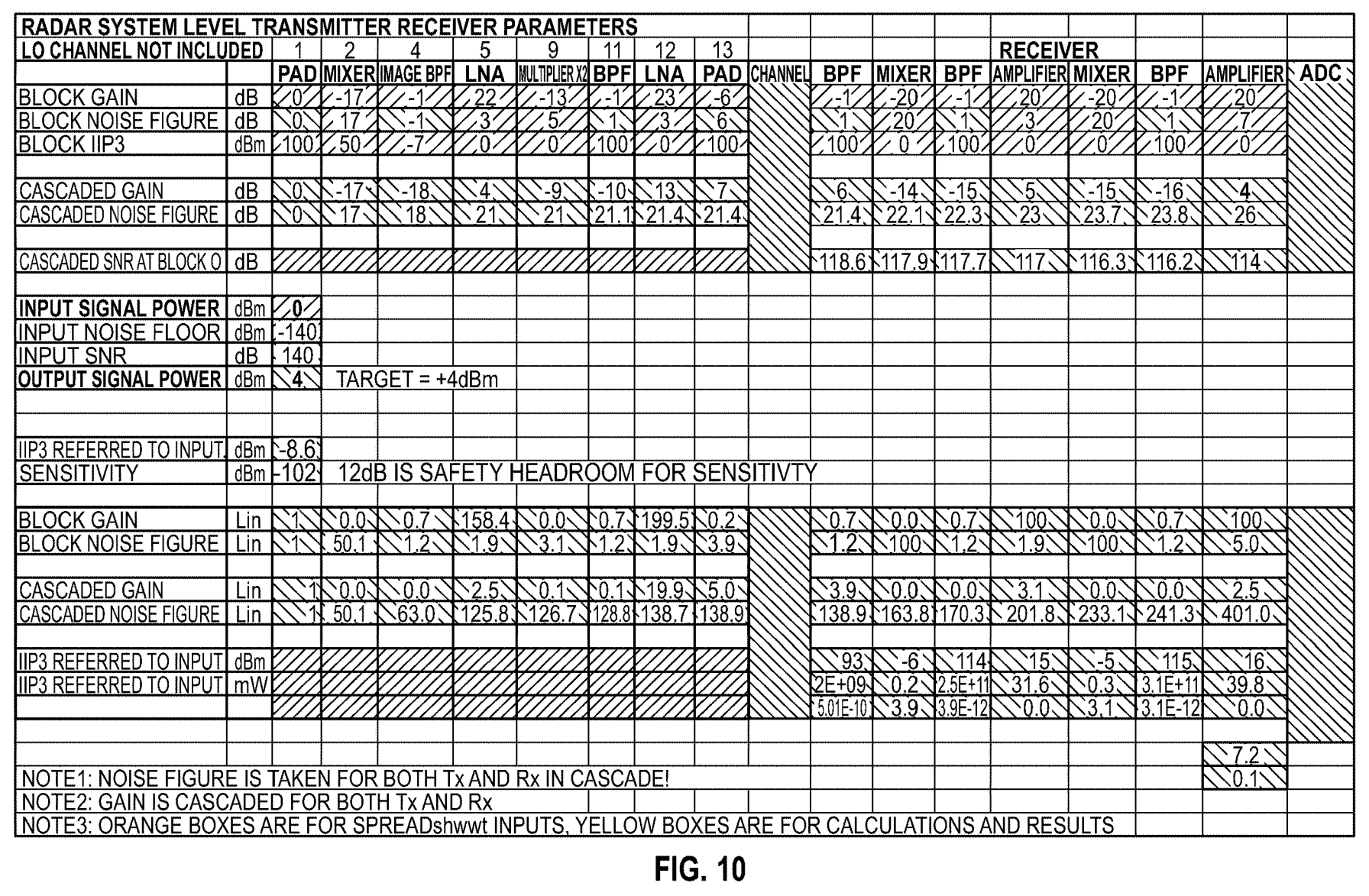

FIG. 10 illustrates a diagram 1000 for receiver and transmitter components and cascaded linearity, gain and noise figure, according to some embodiments. The diagram 1000 illustrates a total system gain of 4 dB. The diagram 1000 further illustrates different stages of the receiver and transmitter that show gain and noise figure levels. Thus, the diagram 1000 shows that the miniaturization of large and space consuming high resolution radar systems operating at the S-Band (2-4 GHz) to levels small enough to be built on a handheld printed circuit board are feasible. The miniaturized digital radar system disclosed herein allow radar electronics to be integrated on a single semiconductor chip.

With microwave systems that the higher the frequency of operation, the smaller the wavelength. This results in a favorable reduction in size of components. However, the higher the frequency, the shorter is the range of coverage it covers. The S-band is an often used frequency range for long range radars that allows for extended range that can reach 100 miles and over. However, such traditional long range radars are very large and bulky.

The miniaturized digital radar system disclosed herein reduces the component count and size of each component without compromising the dynamic range of the radar nor affecting its resolution.

Example Receive, Local Oscillator, and Transmit Channels

Figure 11:
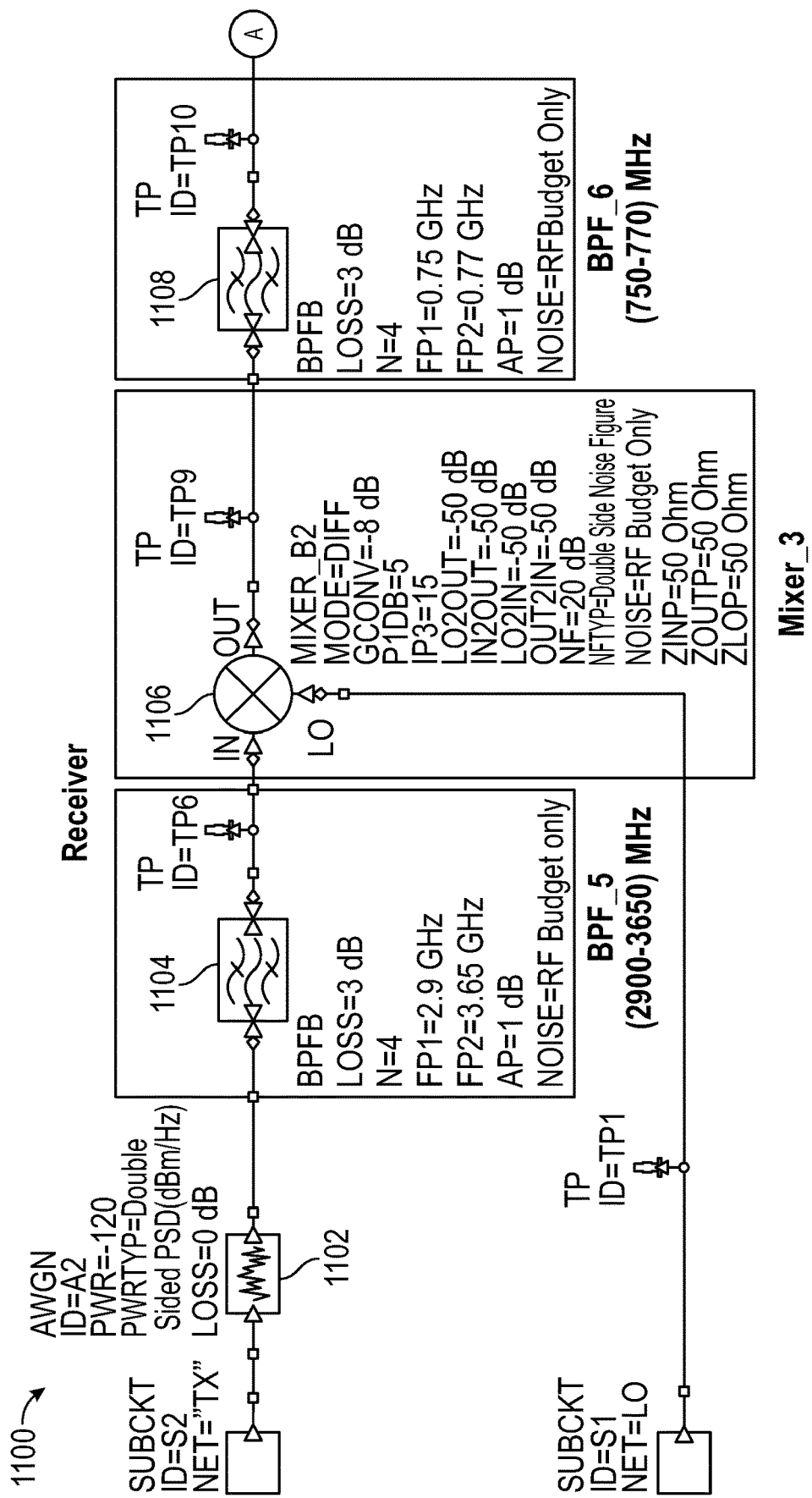
FIG. 11 illustrates a receive channel architecture including two down-converter stages according to some embodiments.
Figure 11:
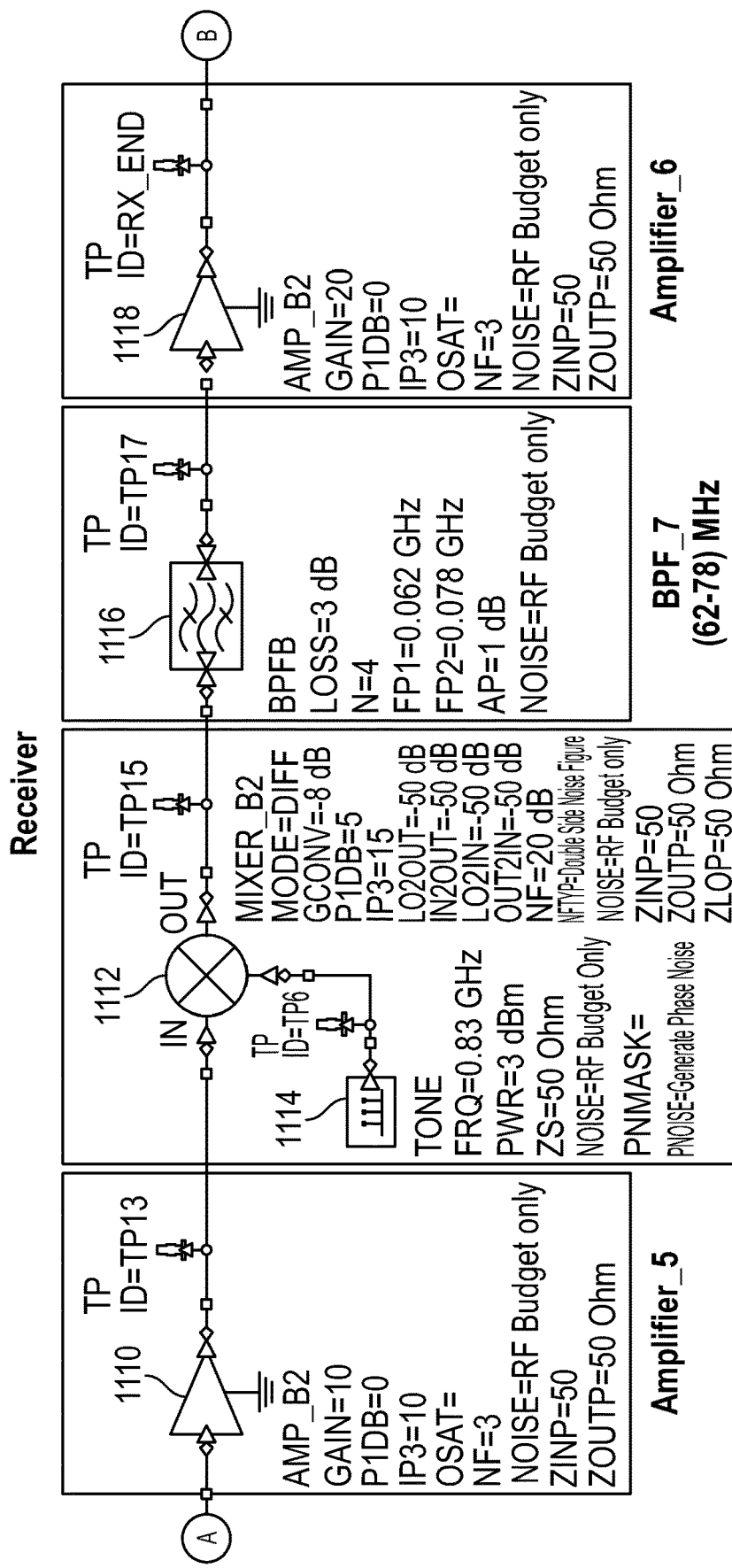
Figure 11:
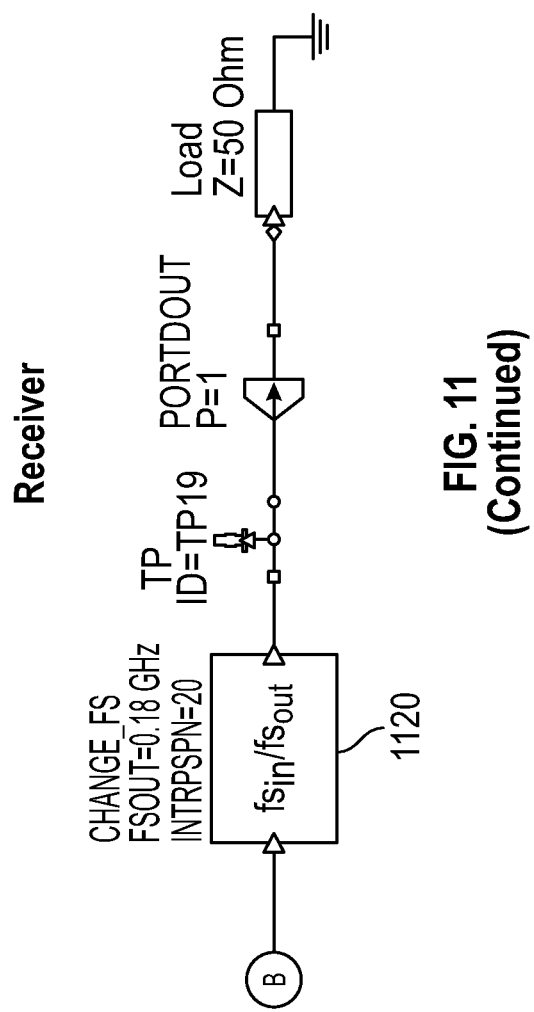

FIG. 11 illustrates a receive channel architecture 1100 including two down-converter stages according to some embodiments. The receive channel architecture 1100 can include a chirp signal generator 1102, a first bandpass filter 1104, a first mixer 1106, a second bandpass filter 1108, a first amplifier 1110, a second mixer 1112, a third bandpass filter 1114, a second amplifier 1116, and an fs in/fs out module 1120 that is a frequency sampler.

In some embodiments, the receive channel architecture 1100 can include a chirp signal generator 1102. The chirp signal generated by the chirp signal generator 1102 can be filtered by a first bandpass filter 1104 upconverted by a first mixer 1106, filtered by a second bandpass filter 1108, and amplified by a first amplifier 1110 in the first up-converter stage.

In some embodiments, the output of the first up-converter stage be upconverted by a second mixer 1112, filtered by a third bandpass filter 1114, and amplified by a second amplifier 1118 in the second up-converter stage.

Figure 12:
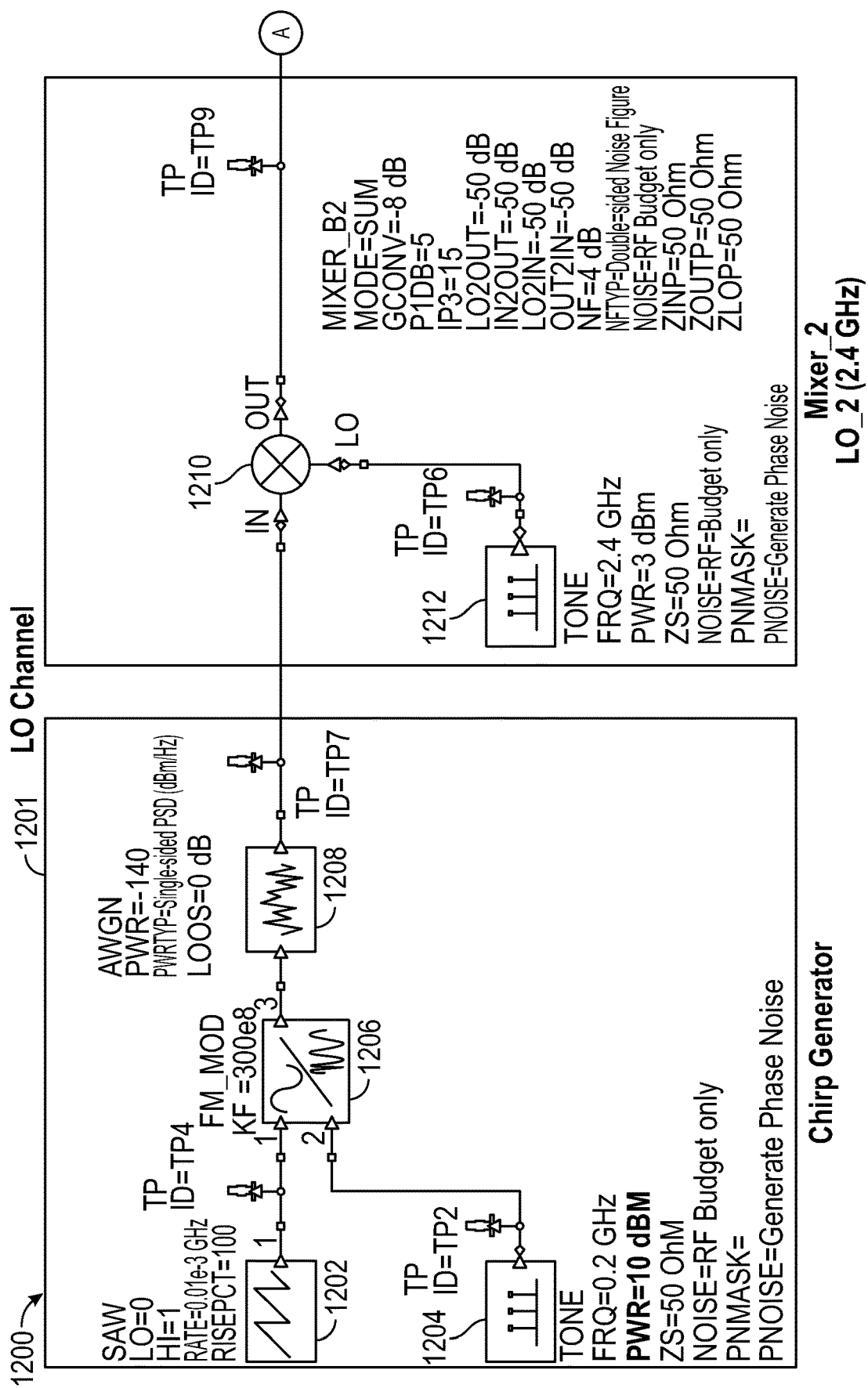
FIG. 12 illustrates a local oscillator channel architecture according to some embodiments.
Figure 12:
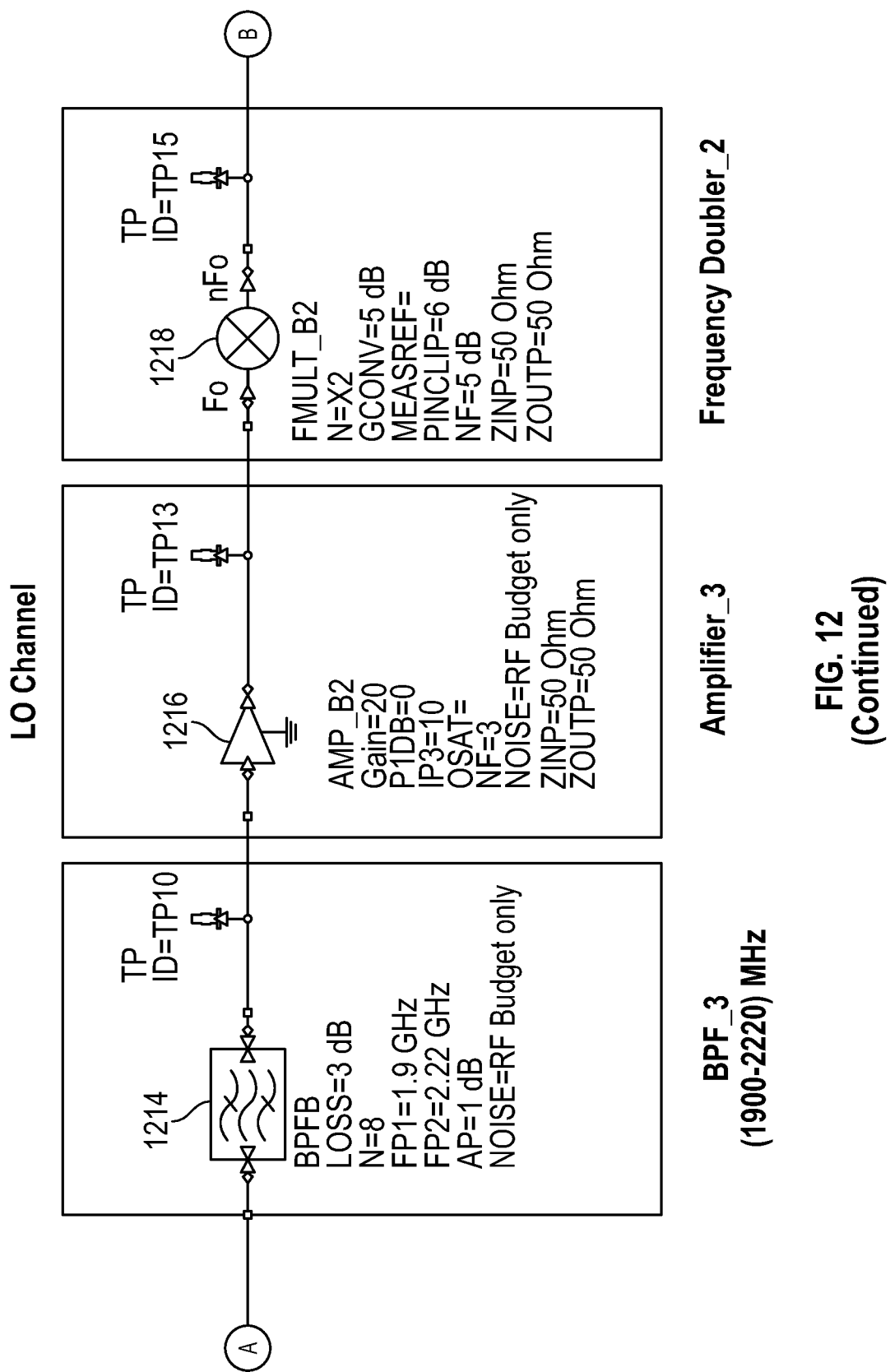
Figure 12:
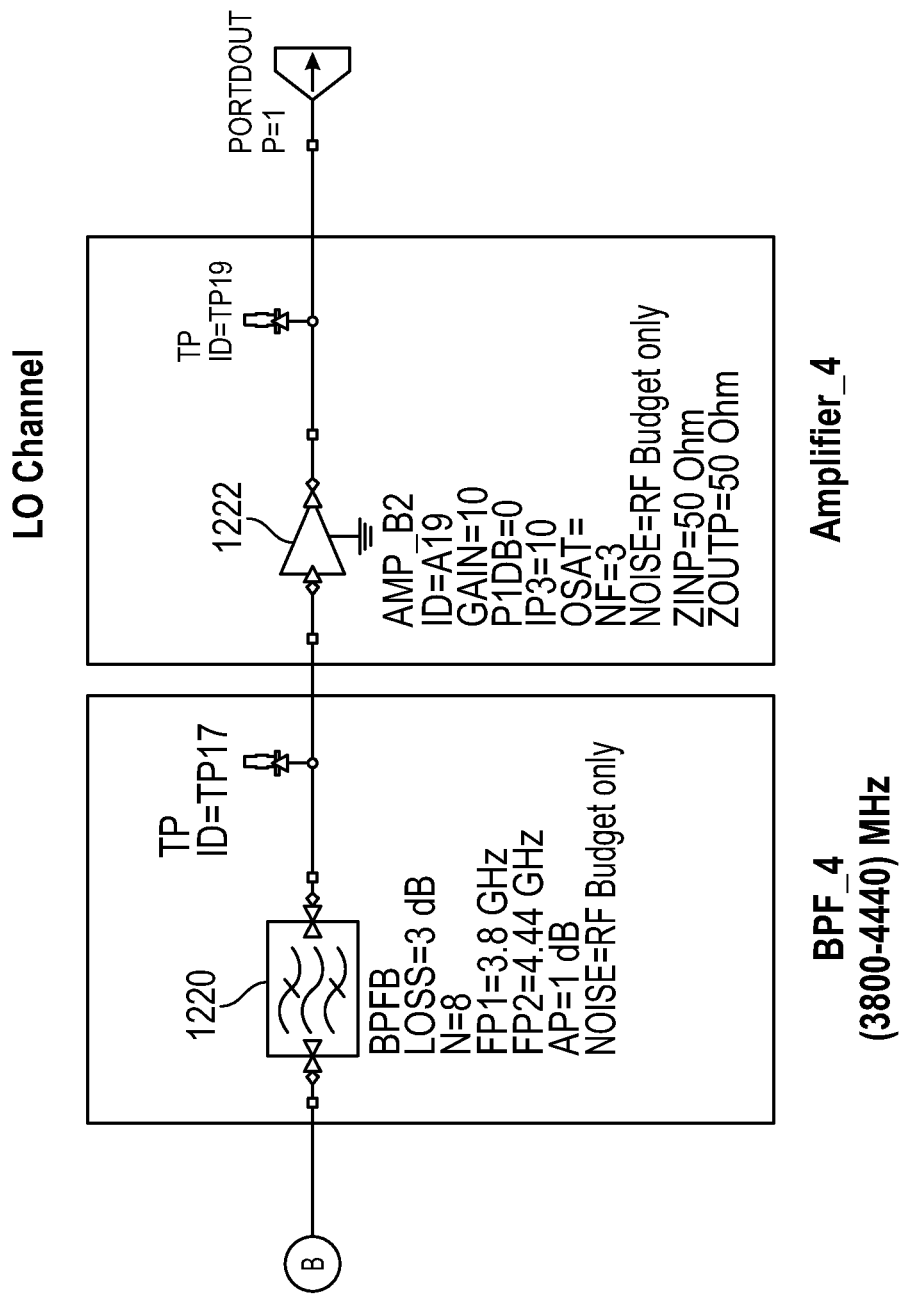

FIG. 12 illustrates a local oscillator channel architecture 1200 according to some embodiments. The local oscillator channel architecture 1200 can include a chirp generator 1201, a first mixer 1210, an oscillator 1212 to generate a low noise frequency, a first bandpass filter 1214, a first amplifier 1216, a second mixer 1218, a second bandpass filter 1220, and a second amplifier 1222. In some embodiments, the chirp generator 1201 can include a sawtooth signal generator 1202, an oscillator 1204 to generate a low noise frequency, a frequency modulator 1206, and an amplitude modulator 1208.

In some embodiments, the local oscillator channel architecture 1200 can include a chirp generator 1201 generates a chirp signal. The chirp signal generated by the chirp generator 1201 can be upconverted by a first mixer 1210, filtered by a first bandpass filter 1214, and amplified by a first amplifier 1216.

In some embodiments, the output of the first amplifier 1216 be upconverted by a second mixer 1218, filtered by a second bandpass filter 1220, and amplified by a second amplifier 1222 to generate a local oscillator signal.

Figure 13:
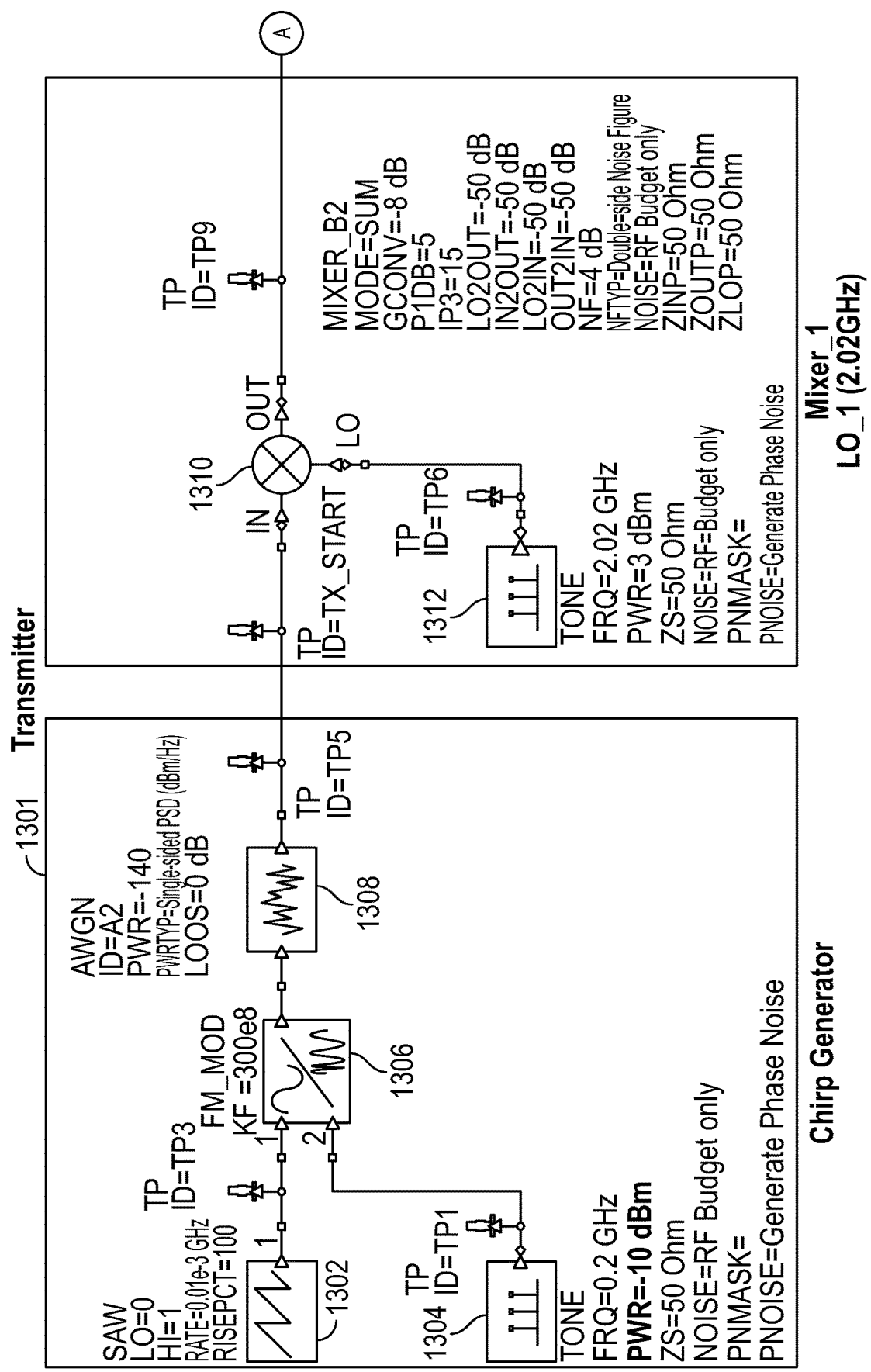
FIG. 13 illustrates a transmit channel architecture including two up-converter stages according to some embodiments.
Figure 13:
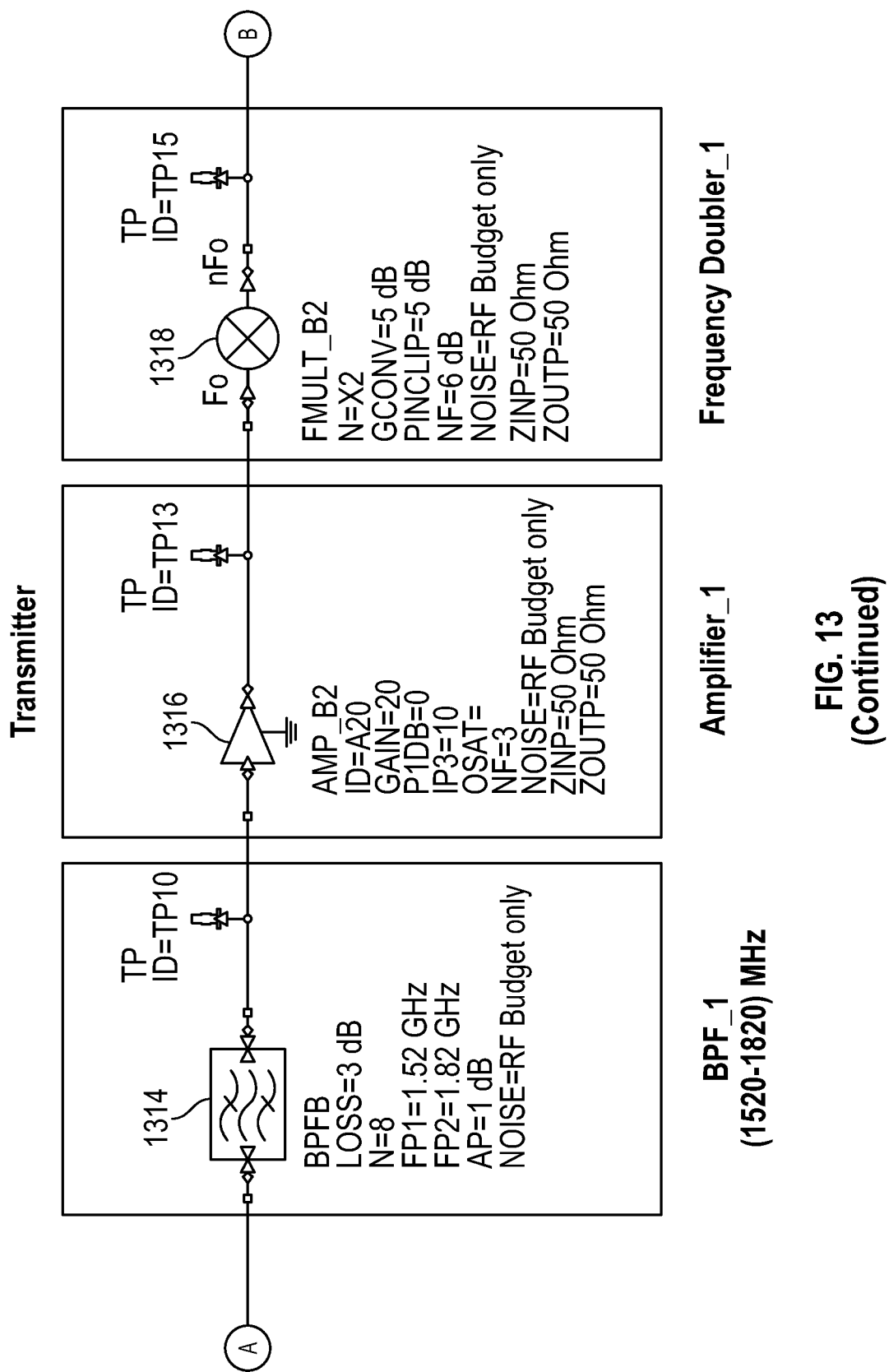
Figure 13:
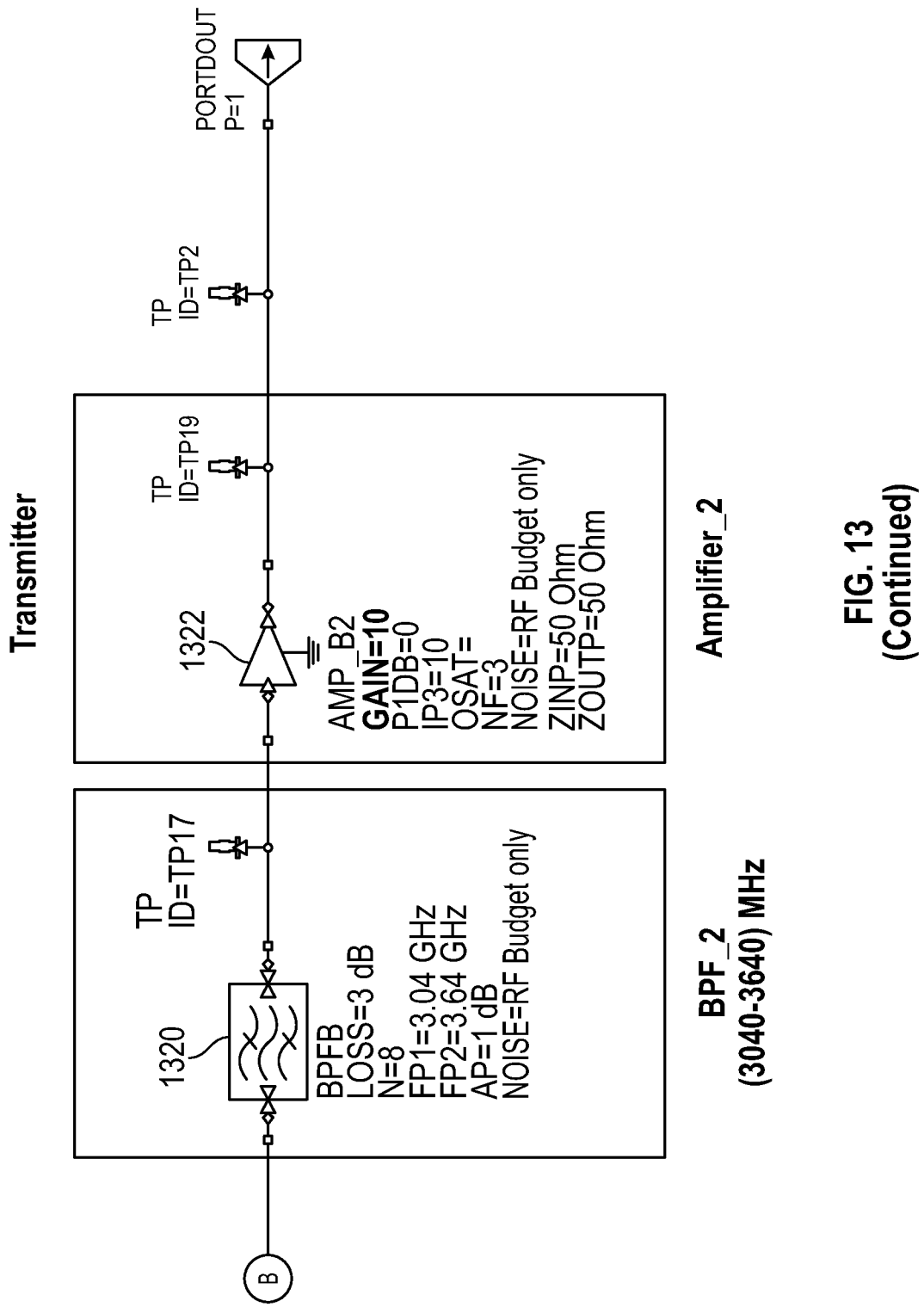

FIG. 13 illustrates a transmit channel architecture including 1300 two up-converter stages according to some embodiments. The transmit channel architecture 1300 can include a chirp generator 1301, a mixer 1310, an oscillator 1312 to generate a low noise frequency, a first bandpass filter 1314, a first amplifier 1316, a second mixer 1318, a second bandpass filter 1320, and a second amplifier 1322.

In some embodiments, the chirp generator 1301 can include a sawtooth signal generator 1302, an oscillator 1304 to generate a low noise frequency at 200 MHz, a frequency modulator 1306, and a wave form generator 1308 to inject noise into the simulation. The chirp generator 1301 can be for simulation purposes, and instead can include an antenna element that receives a reflected transmitted signal.

In some embodiments, the chirp signal generated by the chirp generator 1301 can be downconverted by a first mixer 1310, filtered by a first bandpass filter 1312, and amplified by a first amplifier 1314 in the first down-converter stage.

In some embodiments, the output of the first downconverter stage be downconverted by a second mixer 1318, filtered by a second bandpass filter 1320, and amplified by a second amplifier 1322 in the second down-converter stage.

One key design criteria for the RF section is to ensure an adequate dynamic range that will impact the resolution of the system. The multiple filtering stages and blocks in the system remove interferers that may be taken from external blockers or created internally by un-wanted mixing. More importantly here, the miniature digital radar system implements RF Frequency planning in order to improve the design and focus at internal and external blockers that are likely to be created from the combination of frequencies. By reducing the need for many filters and by using simpler but more robust filtering techniques, the miniature digital radar system provides high dynamic range while enabling a much smaller form factor.

In some embodiments, the miniaturized digital radar system includes a single transmit channel and an antenna that propagates omnidirectionally. In other embodiments, the miniaturized digital radar system includes a plurality of transmit channels and the corresponding antenna elements propagates signals in a particular direction using beamforming.

Advanced Signal Processing for Aerial Drone Detection

In some embodiments, the miniaturized digital radar system is used on an aerial drone platform to detect aerial drones. The miniaturized digital radar system provides a versatile and persistent monitoring capability. Moreover, the miniaturized digital radar system can be used in a manner in which each array channel emits signals with different frequencies. The miniaturized digital radar system can operate as a frequency diverse array radar, which will enable the possibility of illuminating a particular spatial (range and angle) location.

In some embodiments, the miniaturized digital radar system transmits a first beam at a certain frequency and receives reflections of the transmitted first beam. Then, the miniaturized digital radar system transmits a second beam at a different frequency (e.g., difference of 1 MHz, 5 MHz, 10 MHz, 20 MHz) than the first beam and receives reflections of the transmitted second beam.

In some embodiments, the miniaturized digital radar system transmits beams at different frequencies on optimizing a range-angle beam pattern that has a narrow main lobe and low side-lobe levels. Advantageously, the miniaturized digital radar system simplifies the receiver processing along with improving target detectability since particular spatial locations can be interrogated for the presence of a target.

In some embodiments, the miniaturized digital radar system can use the wide waveform bandwidth that can lead to a time-bandwidth product that is not significantly smaller than one resulting in an array response with a frequency-dependent behavior known as dispersion. In order effectively mitigate the effects of jamming, the miniaturized digital radar system compensates for the dispersion in the digital signal processing stage by means of temporal and spatial adaptivity.

In some embodiments, the data from each channel is first divided into multiple narrow sub-bands, and the sub-bands corresponding to the same frequency bin are grouped together. Each sub-band can have a different frequency dependent target steering vector. An important advantage of the stretch processing architecture used by the miniaturized digital radar system is that the sub-banding procedure is essentially free from a computational standpoint, as a natural time-frequency mapping exists since time cells correspond to frequency bins. The digital signal processing algorithm thus combats the dispersive effect while simultaneously forming a null in the direction of an interfering source, thus enabling the system to combat jamming. The miniaturized digital radar system exhibits good null depth while also being robust to imperfections in the calibration of the antenna array. In some embodiments, a filtering architecture that swaps one of the upconverter channels with an oscillator and removing the final stage of filtering at the receiver is disclosed instead of stretch processing, which would allow for the accommodation of other desired waveforms whose bandwidth is compatible with the system.

Other Embodiments

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, a built-in microprocessor onto a receiver, a system-on-chip (SOC), or any combination thereof designed to perform the functions described herein. The control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Language such as "substantially," "about," or "approximately," unless specifically stated otherwise, is otherwise understood to include +/−0.1%, 0.5%, 1%, or 2% difference.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An integrated circuit for a digital radar system, the integrated circuit comprising:
one or more transmit channels, each transmit channel comprising a plurality of up-converter stages, wherein the plurality of up-converter stages comprise:
a first up-converter stage comprising a first mixer configured to up-convert a baseband chirp signal; and
a second up-converter stage comprising a frequency doubler configured to double a frequency of an output of the first up-converter stage to a S-band frequency;
wherein each of the one or more transmit channels comprise at least one programmable time delay, the integrated circuit configured to adjust the programmable time delays to steer transmitted signals in a particular direction with a signal of over 500 MHz;
one or more antenna elements configured to transmit an output of the corresponding transmit channels and receive reflected transmit signals for corresponding receive channels;

a multiple-pole multiple-throw antenna switch configured to electrically connect the one or more transmit channels to the corresponding antenna elements of the one or more antenna elements, and to electrically connect one or more receive channels to the corresponding antenna elements of the one or more antenna elements;

the one or more receive channels, each receive channel comprising a plurality of down-converter stages, wherein the plurality of down-converter stages comprise:

a first down-converter stage comprising a passive mixer configured to perform stretch processing on a signal with approximately 600 MHz bandwidth such that components in the corresponding receive channel operate in a linear region; and a second down-converter stage comprising a second mixer to down-convert the output of the first down-converter stage;

one or more analog-to-digital converters configured to convert the output of corresponding receive channels from analog to digital signals; and a digital signal processor to process the digital signals.

2. The integrated circuit of claim 1, wherein the baseband chirp signal is approximately 300 MHz.

3. The integrated circuit of claim 1, wherein the first down-converter stage further comprises an interdigital bandpass filter configured to increase a first spurious response by approximately three times and suppress a resonant frequency.

4. The integrated circuit of claim 1, wherein the second down-converter stage further comprises a hairpin filter.

5. The integrated circuit of claim 1, wherein the integrated circuit further comprises a local oscillator channel that operates at a frequency that is approximately 760 MHz different than the transmit channels.

6. The integrated circuit of claim 1, wherein the first down-converter stage further comprises an IF filter configured to limit the bandwidth.

7. The integrated circuit of claim 1, wherein the first and second down-converter stages are configured to reduce intermodulation distortion resulting from mixing the reflected transmit signal with a reference local oscillator signal.

8. The integrated circuit of claim 1, wherein the first down-converter stage further comprises a capacitive coupled bandpass filter.

9. The integrated circuit of claim 8, wherein the capacitive coupled bandpass filter comprises parallel L-C resonators.

10. An integrated circuit for a digital radar system, the integrated circuit comprising:

one or more transmit channels, each transmit channel comprises:

a first up-converter stage comprising a first mixer configured to up-convert a baseband chirp signal; and a second up-converter stage comprising a frequency multiplier configured to multiply a frequency of an output of the first up-converter stage to S-band frequency;

one or more antenna elements configured to transmit an output of corresponding transmit channels of the one or more transmit channels and receive reflected transmit signals for corresponding receive channels of one or more receive channels;

an antenna switch configured to electrically connect the one or more transmit channels to the corresponding antenna elements of the one or more antenna elements, and to electrically connect the one or more receive channels to the corresponding antenna elements of the one or more antenna elements;

the one or more receive channels, each receive channel comprises:

a first down-converter stage comprising a second mixer configured to perform stretch processing such that components in the corresponding receive channel operate in a linear region; and a second down-converter stage comprising a third mixer to down-convert the output of the first down-converter stage;

wherein the integrated circuit further comprises a local oscillator channel that synchronizes the one or more receive channels in approximately 400 µs;

one or more analog-to-digital converters configured to convert the output of corresponding receive channels from analog to digital signals; and a digital signal processor to process the digital signals.

11. The integrated circuit of claim 10, wherein the integrated circuit is fabricated on a single printed circuit board (PCB).

12. The integrated circuit of claim 10, wherein the integrated circuit is configured to detect drones.

13. The integrated circuit of claim 10, wherein each of the one or more transmit channels comprise at least one programmable time delay, the integrated circuit configured to adjust the programmable time delays to steer the transmitted signals in a particular direction with a signal of over 500 MHz.

14. The integrated circuit of claim 10, wherein the one or more antenna elements comprise:

a single transmit antenna element configured to transmit the output of the transmit channel omnidirectionally, and a plurality of receive antenna elements configured to receive the reflected transmit signal.

15. The integrated circuit of claim 10, wherein the integrated circuit forms a multi chip module, wherein each of the one or more transmit channels are disposed on separate layers of the multi chip module, and each of the one or more receive channels are disposed on separate layers of the multi chip module.

16. The integrated circuit of claim 10, wherein the integrated circuit forms a multi chip module, wherein each of the one or more receive channels are disposed on separate layers of the multi chip module.

17. The integrated circuit of claim 10, wherein the integrated circuit forms a multi chip module, wherein each of the one or more transmit channels are disposed on separate layers of the multi chip module.

18. A method, the method comprising:

up-converting, by a first mixer of an integrated circuit in a first up-converter stage of a transmit channel, a baseband chirp signal;

multiplying, by a frequency multiplier of an integrated circuit in a second up-converter stage of the transmit channel, an output of the first up-converter stage to S-band frequency;

transmitting an output of the transmit channel;

receiving, by a receive channel, a reflected signal of the transmitted output;

performing, by a second mixer of an integrated circuit in a first down-converter stage of a receive channel, stretch processing on the received reflected signal;

down-converting, by a third mixer of an integrated circuit in a second down-converter stage of the receive channel, an output of the first down-converter stage; and processing, by a processor, digitized signals corresponding to an output of the second down-converter stage, wherein the integrated circuit forms a multi-chip module, wherein the transmit and receive channels are disposed on separate layers of the multi-chip module.

19. The method of claim 18, wherein processing the digitized signals comprises detecting airplanes.

* * * * *